(12) United States Patent
Zhang et al.

(10) Patent No.: US 11,294,124 B2
(45) Date of Patent: Apr. 5, 2022

(54) MECHANICAL JOINT FOR USE IN FIBER OPTIC IMAGING SYSTEMS

(71) Applicant: Magic Leap, Inc., Plantation, FL (US)

(72) Inventors: Xiaoyang Zhang, Alviso, CA (US); Vaibhav Mathur, Weston, FL (US); Michael Robert Johnson, Plantation, FL (US); Timothy Mark Dalrymple, Gainesville, FL (US); Andrew C. Duenner, Houston, TX (US); Albert Daniel Carlomagno, Hollywood, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/902,498

(22) Filed: Jun. 16, 2020

(65) Prior Publication Data
US 2020/0310037 A1    Oct. 1, 2020

Related U.S. Application Data

(63) Continuation of application No. 16/596,263, filed on Oct. 8, 2019, now Pat. No. 10,732,355, which is a
(Continued)

(51) Int. Cl.
*G02B 6/36* (2006.01)
*G02B 26/10* (2006.01)
*G02B 6/26* (2006.01)

(52) U.S. Cl.
CPC .......... *G02B 6/3604* (2013.01); *G02B 6/262* (2013.01); *G02B 26/103* (2013.01);
(Continued)

(58) Field of Classification Search
None
See application file for complete search history.

(56) References Cited

U.S. PATENT DOCUMENTS

| 4,208,087 A | 6/1980 | Cooper |
| 4,415,228 A | 11/1983 | Stanley |

(Continued)

FOREIGN PATENT DOCUMENTS

| JP | H10197819 A | 7/1998 |
| JP | 2010097083 A | 4/2010 |

(Continued)

OTHER PUBLICATIONS

Extended European Search Report for Application No. 18809905,5, dated Mar. 17, 2020, 9 pages.
(Continued)

*Primary Examiner* — Jerry Rahll
(74) *Attorney, Agent, or Firm* — Fish & Richardson P.C.

(57) ABSTRACT

An example apparatus includes an optical fiber, an actuator, and a joint mechanically coupling the actuator to the optical fiber. The joint includes a neck extending along an axis. The optical fiber is threaded through an aperture extending along the axis through the neck. The optical fiber is attached to the joint at a surface of the neck facing the axis. The joint also includes a collar extending along the axis. The actuator is mechanically attached to the joint at an inner surface of the collar facing the axis. The joint also includes a flexural element extending radially from the neck to the collar. During operation, the joint couples a force from the actuator to the optical fiber to vary an orientation of a portion of the optical fiber extending from the neck with respect to the axis.

13 Claims, 20 Drawing Sheets

Related U.S. Application Data continuation of application No. 15/991,851, filed on May 29, 2018, now Pat. No. 10,481,337.

(60) Provisional application No. 62/513,082, filed on May 31, 2017.

(52) U.S. Cl.
CPC .......... *G02B 6/3624* (2013.01); *G02B 6/3644* (2013.01); *G02B 6/3656* (2013.01)

(56) References Cited

U.S. PATENT DOCUMENTS

| | | | |
|---|---|---|---|
| 5,225,950 | A | 7/1993 | Crane |
| 6,856,712 | B2 | 2/2005 | Fauver et al. |
| 8,503,837 | B2 | 8/2013 | Beresnev et al. |
| 10,481,337 | B2 | 11/2019 | Zhang et al. |
| 2001/0055462 | A1 | 12/2001 | Seibel |
| 2008/0144998 | A1 | 6/2008 | Melville et al. |
| 2008/0291597 | A1 | 11/2008 | Seibel et al. |
| 2010/0129027 | A1 | 5/2010 | Korn |
| 2012/0224824 | A1 | 9/2012 | Beresnev |
| 2013/0315538 | A1 | 11/2013 | Kuffel |
| 2014/0226936 | A1 | 8/2014 | Sun |
| 2015/0230865 | A1 | 8/2015 | Sivriver et al. |
| 2015/0268415 | A1 | 9/2015 | Schowengerdt |
| 2015/0281630 | A1 | 10/2015 | Melville et al. |
| 2017/0038536 | A1 | 2/2017 | Beresnev |
| 2018/0348440 | A1 | 12/2018 | Zhang et al. |
| 2020/0049895 | A1 | 2/2020 | Zhang et al. |

FOREIGN PATENT DOCUMENTS

| | | |
|---|---|---|
| JP | 2010122472 A | 6/2010 |
| TW | 200732721 A | 9/2007 |
| WO | WO2005080742 A1 | 9/2005 |
| WO | 2016075777 A1 | 10/2017 |

OTHER PUBLICATIONS

PCT International Search Report and Written Opinion for International Application No. PCT/US2018/034894, dated Aug. 24, 2018, 13 pages.
PCT International Preliminary Report on Patentability in International Appln. No. PCT/US2018/034894, dated Dec. 3, 2019, 8 pages.
Smith, "Flexure: Elements of Elastic Mechanisms," CRC Press, Boca Raton, 2000, p. 211-213, 288-297.
CN Office Action in Chinese Appln. No. 201880048898.6, dated Mar. 3, 2021, 13 pages (with English translation).
CN Office Action in Chinese Appln. No. 201880048898.6, dated Jul. 20, 2021, 7 pages (with English translation).
EP Extended European Search Report in European Appln. No. 21167340.5, dated Jun. 18, 2021, 8 pages.
JP Office Action in Japanese Appln. No. 2019-566166, dated Aug. 10, 2021, 6 pages (with English translation).
TW Office Action in Taiwanese Appln. No. 107118533, dated Jun. 30, 2021, 6 pages (with English translation).
Office Action in Japanese Appln. No. 2019-566166, dated Nov. 26, 2021, 5 pages (with English translation).
Notice of Allowance in Korean Appln. No. 10-2019-7038692, dated Jan. 21, 2022, 4 pages (with English translation).

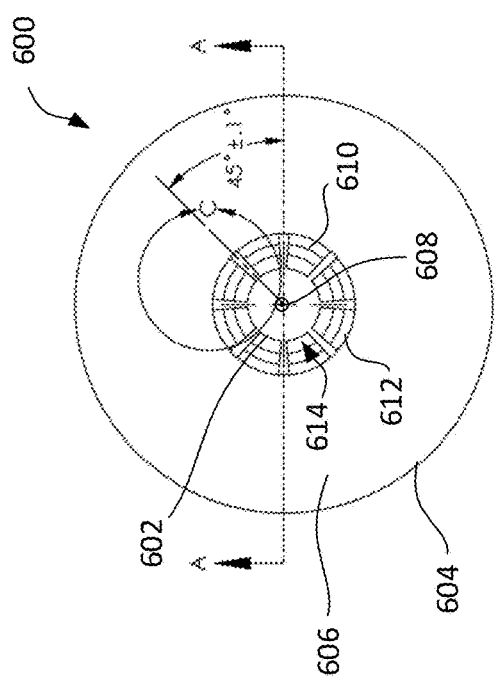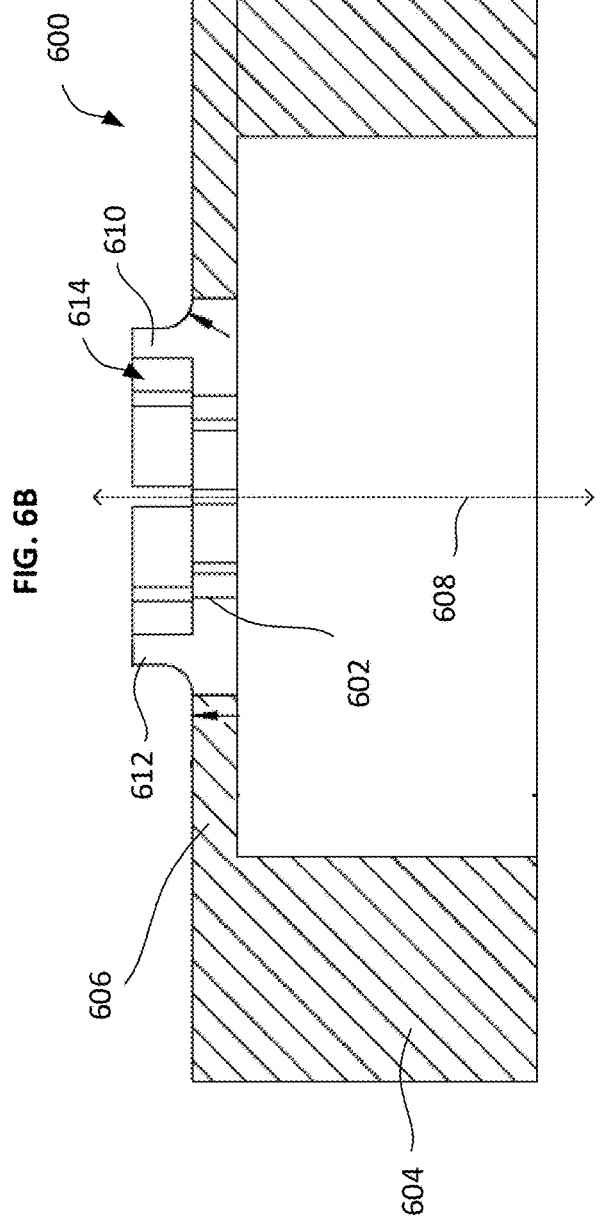

MECHANICAL JOINT FOR USE IN FIBER OPTIC IMAGING SYSTEMS

CROSS-REFERENCE TO RELATED APPLICATION

This application is a continuation of U.S. application Ser. No. 16/596,263, filed on Oct. 8, 2019, which is a continuation of U.S. application Ser. No. 15/991,851, filed on May 29, 2018, now U.S. Pat. No. 10,481,337, which claims the benefit of the filing date of U.S. Provisional Application No. 62/513,082, filed on May 31, 2017. The contents of U.S. Application Nos. 62/513,082; 15/991,851; and 16/596,263 are incorporated herein by reference in their entirety.

TECHNICAL FIELD

This disclosure relates to mechanical joints for use in fiber optic imaging systems, such as fiber scanned display devices.

BACKGROUND

Imaging systems can be used to present visual information to a user. For example, an imaging system can include an optical component that projects images onto an imaging surface, such that one or more users can view the image. In some cases, imaging systems can be incorporated into a head-mounted display device to present visual information in a more immersive manner. For example, head-mounted displays can be used to present visual information for virtual reality (VR) or augmented reality (AR) systems.

SUMMARY

Implementations of a mechanical joint for physically coupling an actuator to a waveguide are described herein. One or more of the described implementations can be used in conjunction with fiber optic imaging systems, such as fiber scanned display devices.

Implementation of the mechanical joint can provide various benefits. For example, one or more of the mechanical joints described herein enable a fiber optic imaging system to operate with a high degree of precision, thereby improving image quality. Further, one or more of the mechanical joints described herein can be constructed precisely and consistently, and thus may be suitable for use in variation-specific applications (e.g., in imaging systems that may be highly sensitive to the properties of a mechanical joint, such as fiber scanned display devices). Further, mechanical joints can be readily mass produced. Further still, the design of mechanical joints can be readily modified and implemented, and thus can be readily used in a variety of different applications.

In general, in an aspect, an apparatus includes an optical fiber, an actuator, and a joint mechanically coupling the actuator to the optical fiber. The joint includes a neck extending along an axis. The optical fiber is threaded through an aperture extending along the axis through the neck. The optical fiber is attached to the joint at a surface of the neck facing the axis. The joint also includes a collar extending along the axis. The actuator is mechanically attached to the joint at an inner surface of the collar facing the axis. The joint also includes a flexural element extending radially from the neck to the collar. During operation, the joint couples a force from the actuator to the optical fiber to vary an orientation of a portion of the optical fiber extending from the neck with respect to the axis.

Implementations of this aspect can include one or more of the following features.

In some implementations, the flexural element can include an annular portion extending between the neck and the collar.

In some implementations, the flexural element can include one or more beams extending between the neck and the collar.

In some implementations, the collar can extend along the axis in a direction away from the neck.

In some implementations, the collar can extend along the axis about a periphery of the neck.

In some implementations, the joint can be rotationally symmetric about the axis. The joint can have at least four-fold rotational symmetry about the axis.

In some implementations, the joint can have a first stiffness with respect to the axis, a second stiffness with respect to a first radial direction, and a third stiffness with respect to a second radial direction orthogonal the first radial direction. The first stiffness can be greater than the second stiffness and the third stiffness. The second stiffness and the third stiffness can be substantially equal.

In some implementations, the joint can include crystalline silicon. The crystalline silicon can have a (111) crystal structure.

In some implementations, the joint can include amorphous silicon.

In some implementations, the joint can include one or more layers of silicon and one or more layers of electrically insulative material. The electrically insulative material can include silicon dioxide.

In some implementations, the outer portion can have a substantially circular cross-section. The neck can have an inner diameter less than 200 μm. The neck can have an outer diameter less than 300 μm.

In some implementations, the neck can define one or more slots along a periphery of the neck.

In some implementations, the collar can have a substantially circular cross-section. The collar can have an inner diameter less than 1500 μm. The collar can have an outer diameter less than 2000 μm.

In some implementations, the collar can define one or more slots along a periphery of the collar.

In some implementations, the apparatus can further include an illumination source in optical communication with the optical fiber. The illumination source can be configured, during operation, to direct light into the optical fiber. The actuator can be configured, during operation, to vary the orientation of the portion of the optical fiber such that a first end of the optical fiber traverses a pre-defined pattern. The optical guide can be configured, during operation, to receive light from the illumination source, guide the received light to an end of the optical fiber, and emit the received light from the first end of the optical fiber.

In some implementations, the flexural element can define one or more slots extending through the flexural element.

In some implementations, the one or more slots can be spirally arranged about the axis.

In some implementations, the flexural element can include a gimbal structure. The gimbal structure can include a ring, a plurality of inner beams mechanically coupling the neck to the ring, and a plurality of outer beams mechanically coupling the ring to the collar.

The details of one or more embodiments are set forth in the accompanying drawings and the description below.

Other features and advantages will be apparent from the description and drawings, and from the claims.

DESCRIPTION OF DRAWINGS

FIG. 6B shows a top view of the mechanical joint shown in FIG. 6A.

FIG. 6C shows a cross-sectional view of the mechanical joint shown in FIG. 6A.

DETAILED DESCRIPTION

In general, a fiber scanned display (FSD) device projects images onto an imaging surface by directing a time-modulated light pattern through an optical fiber while vibrating the optical fiber tip. For instance, a FSD device can vibrate an optical fiber using an actuator, such that the tip of the optical fiber travels along or "scans" a predictable predefined pattern or path (e.g., a spiral). As the tip of the optical fiber scans the pattern, modulated light is transmitted through the optical fiber, such that light is emitted from the tip of the optical fiber in a spatially-dependent manner. Accordingly, images can be spatially "scanned" onto an imaging surface by continuously vibrating the optical fiber while transmitting a sequence of light pulses into the optical fiber.

Figure 1A:
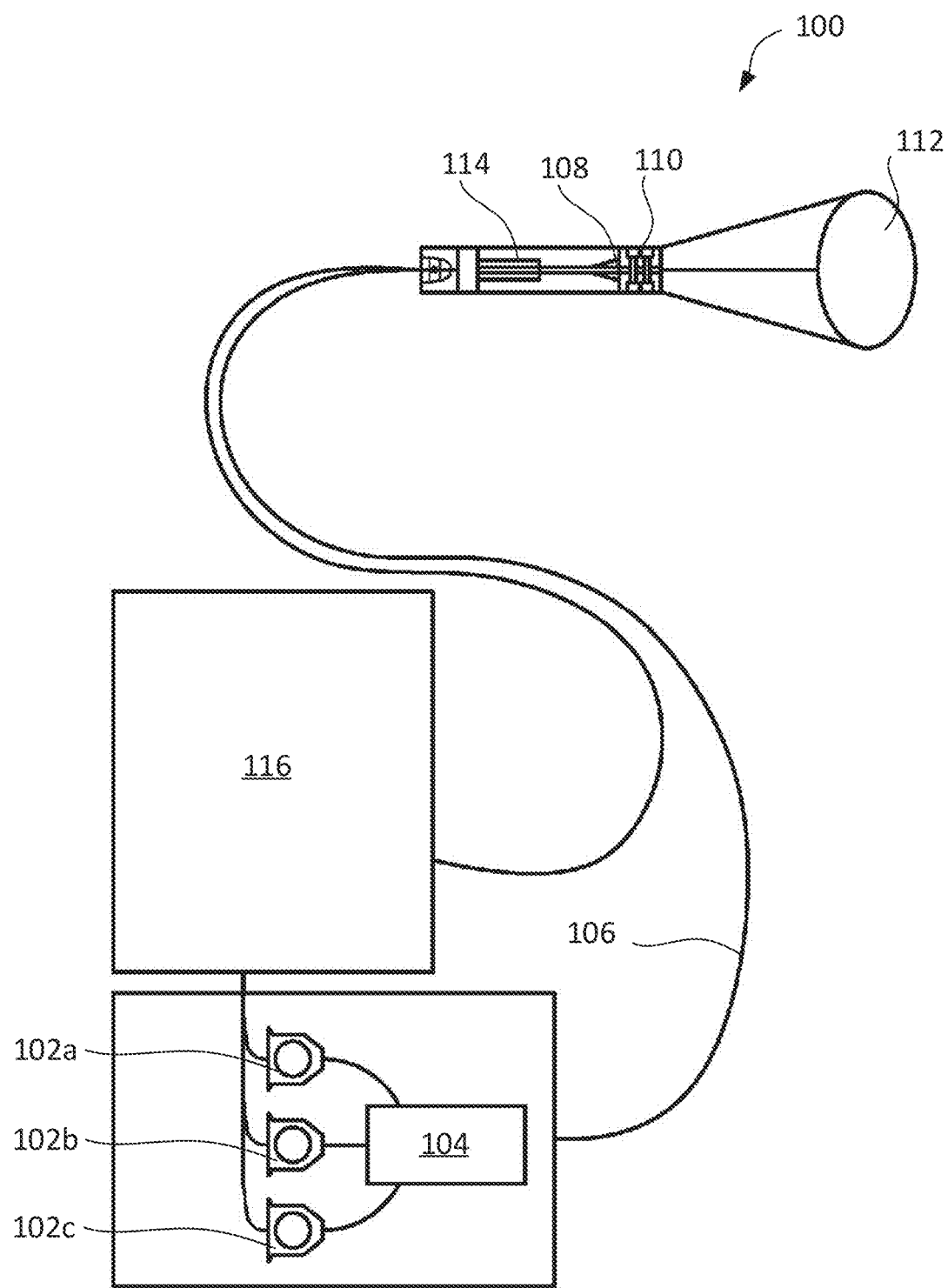
FIG. 1A is a schematic diagram of an example fiber scanned display device.

An example FSD device 100 is shown schematically in FIG. 1A. The FSD device 100 includes several radiation sources 102a-c configured to emit light (e.g., a red laser, a green laser, and a blue laser, respectively). The radiation sources 102a-c are optically coupled to a first waveguide 104 (e.g., a red-green-blue (RGB) combiner), such that light emitted by each of the radiation sources is combined. The combined light from the first waveguide 104 is relayed by a second waveguide 106 (e.g., a single mode optical fiber) optically coupled to the first waveguide 104. In turn, the light from the second waveguide 106 is emitted from its tip 108 (e.g., a cantilevered fiber tip).

The emitted light passes through a lens assembly 110 that focuses the emitted light onto an image plane 112. As the light is being emitted, the waveguide tip 108 is scanned along one or more axes by an actuator 114 (e.g., a piezo-electric tube actuator), such that the emitted light is projected according to a scan pattern along the image plane 112 (e.g., a spiral). As a result, a scanned image (e.g., a spiral-scanned image) is formed on the image plane 112.

Figure 1B:
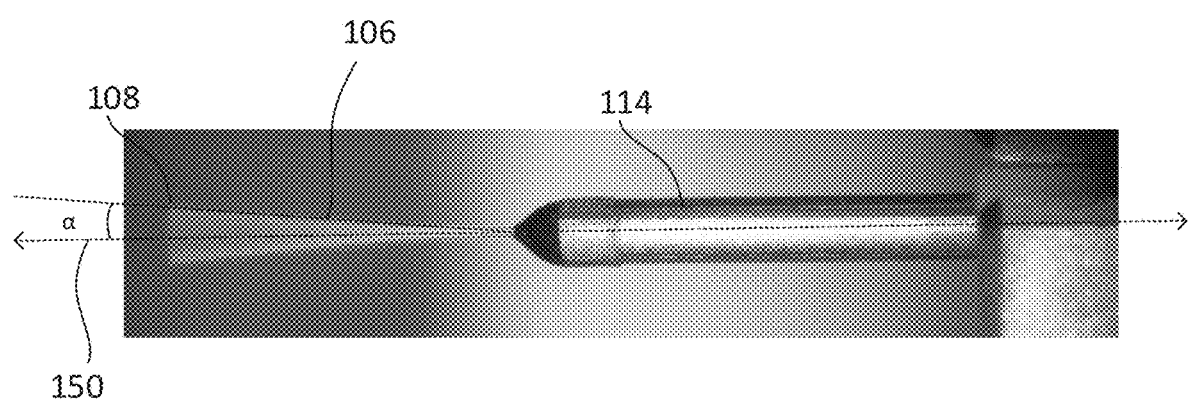
FIG. 1B shows an example deflection of a waveguide tip.

As shown in FIG. 1B, the waveguide tip 108 can be scanned by imparting a force onto the waveguide 106 using the actuator 114. The waveguide 106 is flexible, causing the waveguide tip 108 to deflect by an angle α relative to the longitudinal axis 150 of the actuator 114. Operation of the actuator 114 can be selectively regulated to deflect the waveguide tip 108 along one or more axes orthogonal to axis 150, such that the waveguide tip 108 scans a particular predefined pattern.

The intensity of light emitted by the radiation sources 102a-c is modulated so that the light is coupled into the waveguide 106 as a sequence of pulses. The FSD device 100 coordinates the pulse sequence with the actuation of the waveguide tip 108 such that light is selectively emitted from the waveguide tip 108 in a spatially-dependent manner so as to form an image. For example, as the actuator 114 is continuously scanning the waveguide tip 108 according to a predictable predefined pattern, the radiation sources 102a-c each can selectively emit light and/or regulate the intensity of light emission according to that pattern and in sufficiently short time intervals, such that the sequentially formed light pattern on the image plane 112 appears as an image to the user. This can be useful, for example, to depict objects, shapes, and/or patterns on the image plane 112. Further still, the radiation sources can also emit light in according to a dynamic pattern, such as a sequence of different images are projected onto the image source over time (e.g., to impart a sense of motion, such as in a video sequence, on the image plane 112).

As shown in FIG. 1A, the FSD device 100 includes a drive module 116 that coordinates the operation of the actuator 114 and the operation of the radiation sources 102a-c. For instance, the drive module 116 can generate a drive signal to the actuator 114 to control the actuation of the actuator 114 (e.g., such that the actuator 114 causes the waveguide tip 108 to scan a predictable predefined pattern). The drive module 116 can also generate a pixel modulation signal to regulate the output of the radiation sources 102a-c in accordance with the actuation of the actuator 114. The drive signal and the pixel modulation signal can be transmitted simultaneously to the actuator 114, such that pixels are formed at specific spatial locations along the image plane 112.

Figure 1C:
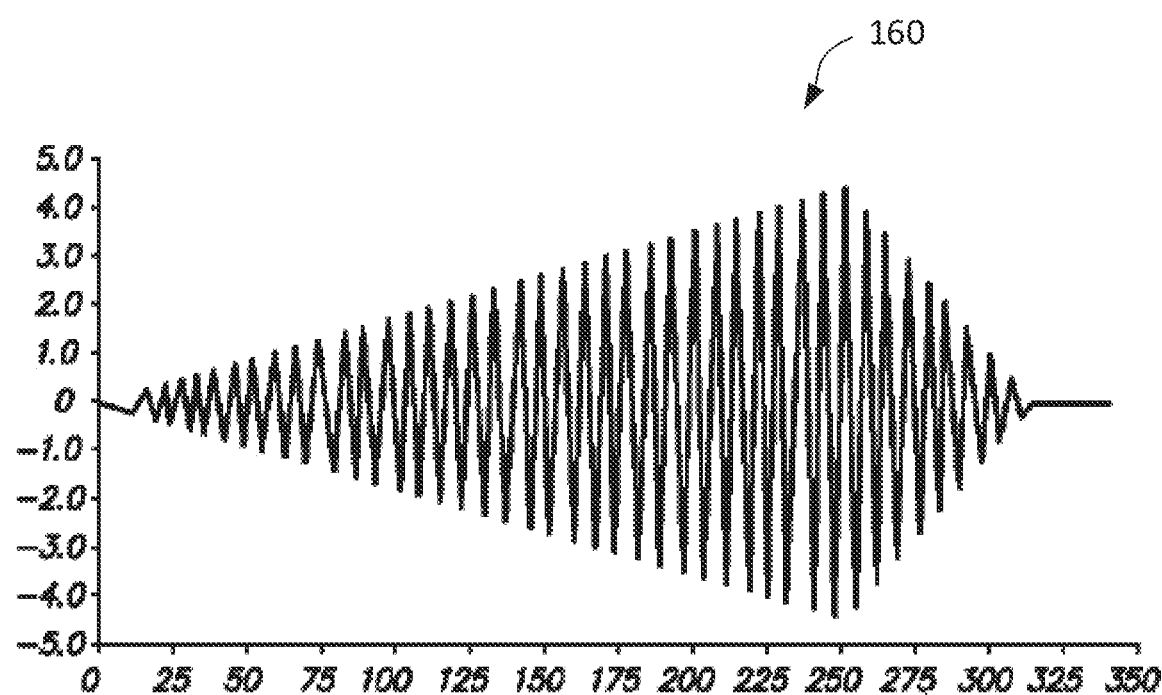
FIG. 1C shows a plot of an example modulation pattern.
Figure 1D:
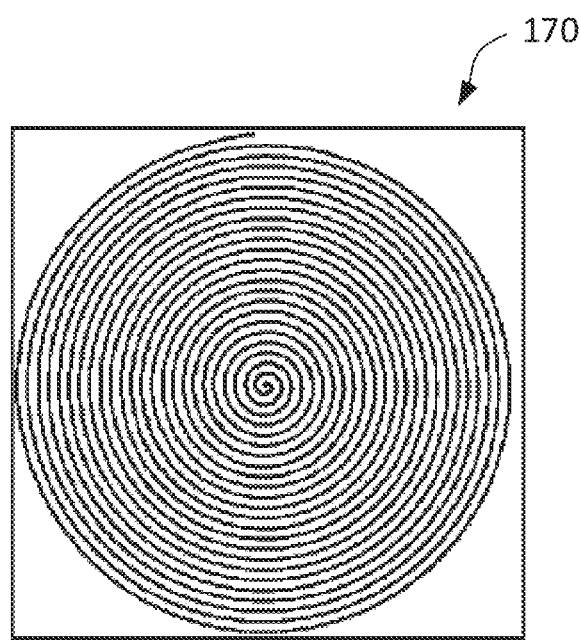
FIG. 1D shows an example scan pattern.

As an example, a drive signal can be modulated in accordance with the exemplary pattern shown in plot 160 of FIG. 1C, such that the signal constitutes a sinusoidal drive signal that is amplitude modulated over time. The drive signal can include a sinusoidal signal portion that drives one scan axis of actuator 114, as well as a second sinusoidal signal portion that drives a second scan axis. The second sinusoidal drive signal is phase-shifted relative to the first drive signal portion, such that the waveguide tip 108 sweeps through a circular scan pattern. The sinusoidal drive signal can be amplitude modulated over time to dilate and contract this circular scan pattern to form an area-filling spiral scan pattern. A simplified scan pattern 170 is shown in FIG. 1D. Similarly, the pixel modulation signal can be generated in accordance with the scan pattern 170, such that pixels are formed at specific spatial locations along the scan pattern 170.

In some cases, multiple FSD devices can be used in conjunction (e.g., in a two-dimensional array) to increase the quality of the projected image. As an example, multiple FSD devices can be implemented in an array to increase the resolution of projected images, increase the pixel density of projected images, and/or to increase the frame rate by which images are projected.

Implementations of the FSD device 100 can be used in a variety of imaging applications. For example, in some cases, FSD devices 100 implemented in a head mounted display device. One or more FSD devices 100 can be used to project images onto eyepieces positioned over a user's eyes, such that they are within the user's field of view. In some cases, FSD devices 100 can be implemented as a part of a "virtual reality" system or an "augmented reality" system to present images in a visually immersive manner.

As described with respect to FIG. 1A, an actuator 114 imparts a force onto the waveguide 106, such that the waveguide tip 108 is scanned along one or more axes according to a predictable predefined pattern. This can be implemented by mechanically coupling the actuator 114 to the waveguide 106 using a mechanical joint 200.

Figure 2A:
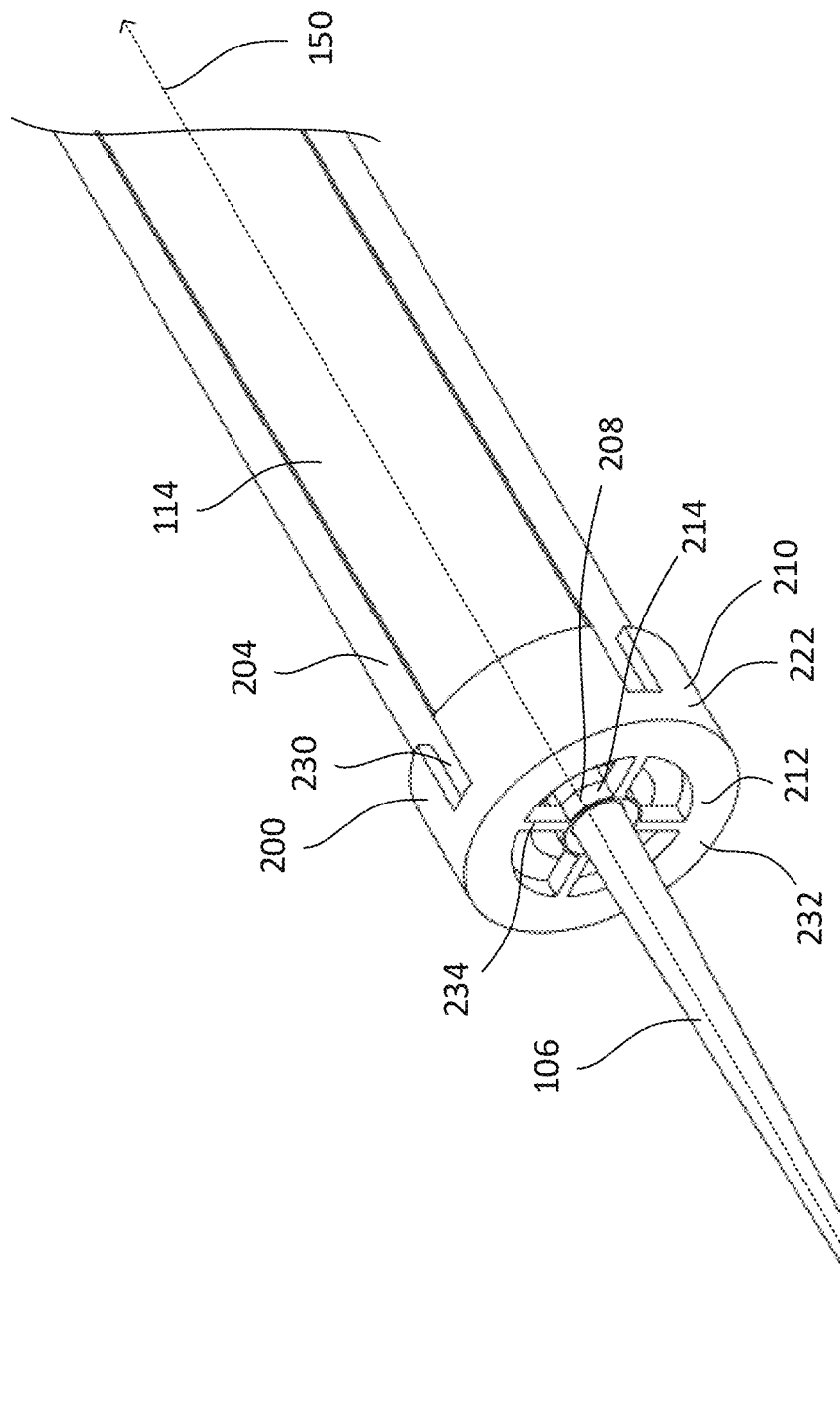
FIG. 2A shows a perspective view of an example actuator, an example waveguide, and an example mechanical joint.
Figure 2B:
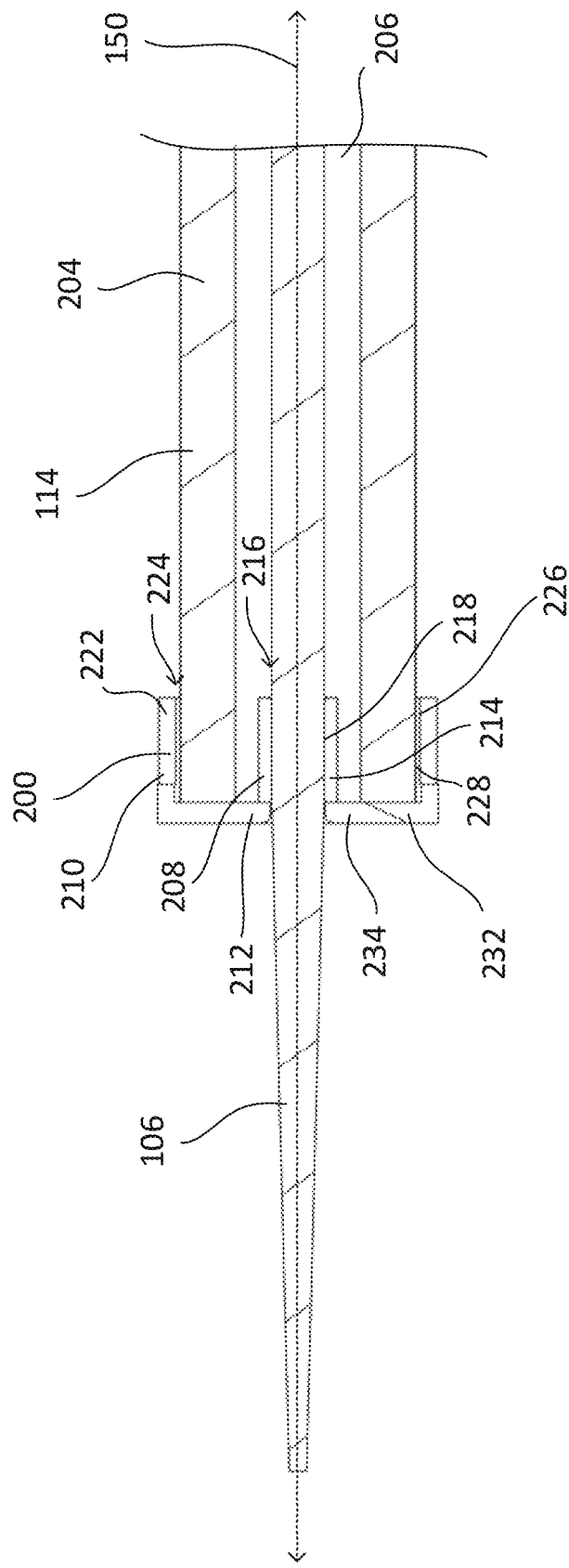
FIG. 2B shows a cross-sectional view of the components shown in FIG. 2A.
Figure 3A:
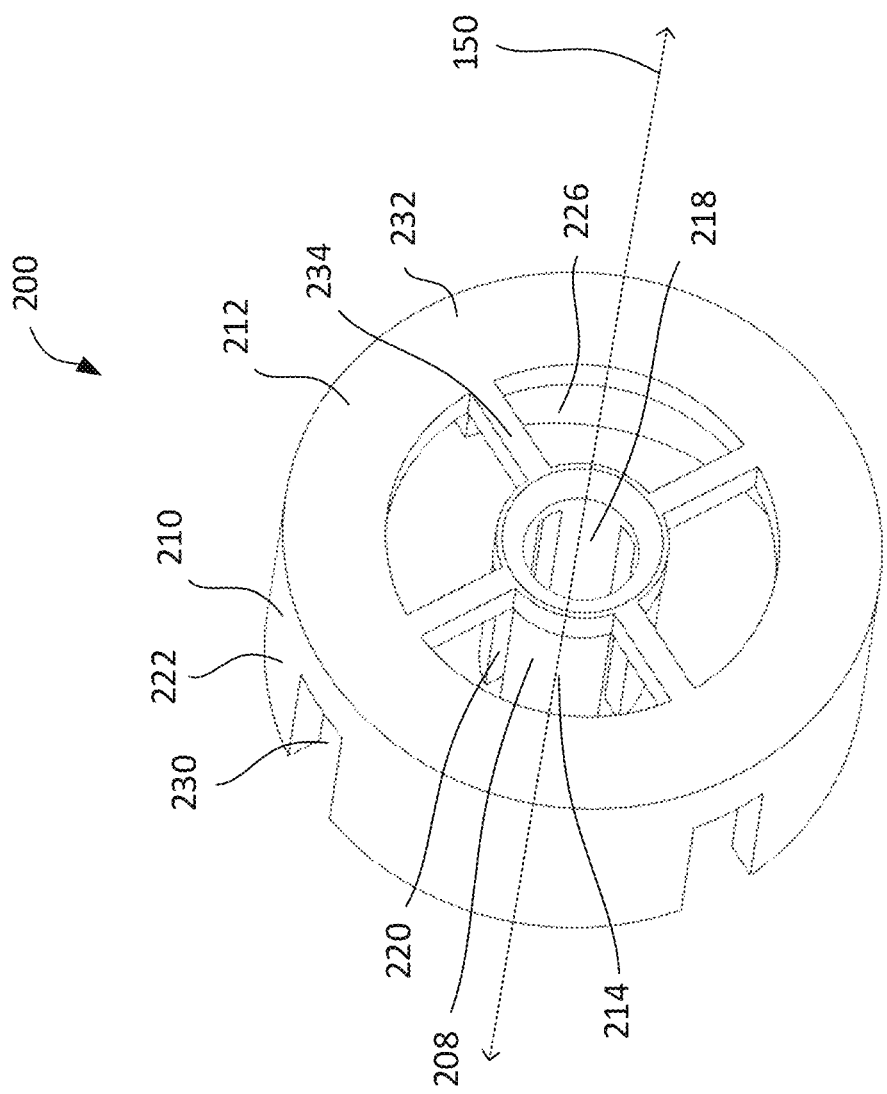
FIG. 3A shows a front perspective view of the example mechanical joint shown in FIGS. 2A and 2B.
Figure 3B:
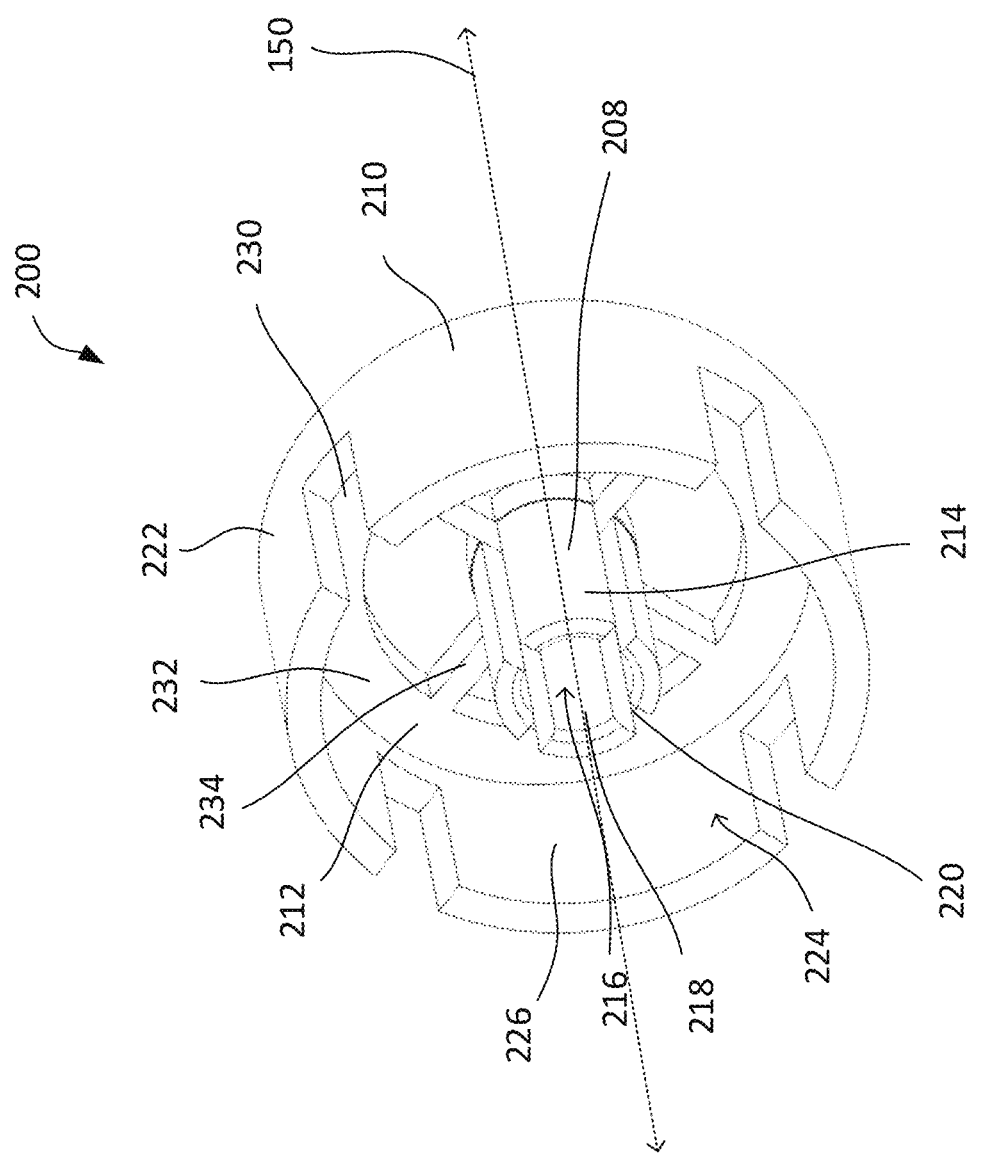
FIG. 3B shows a rear perspective view of the example mechanical joint shown in FIGS. 2A and 2B.
Figure 3C:
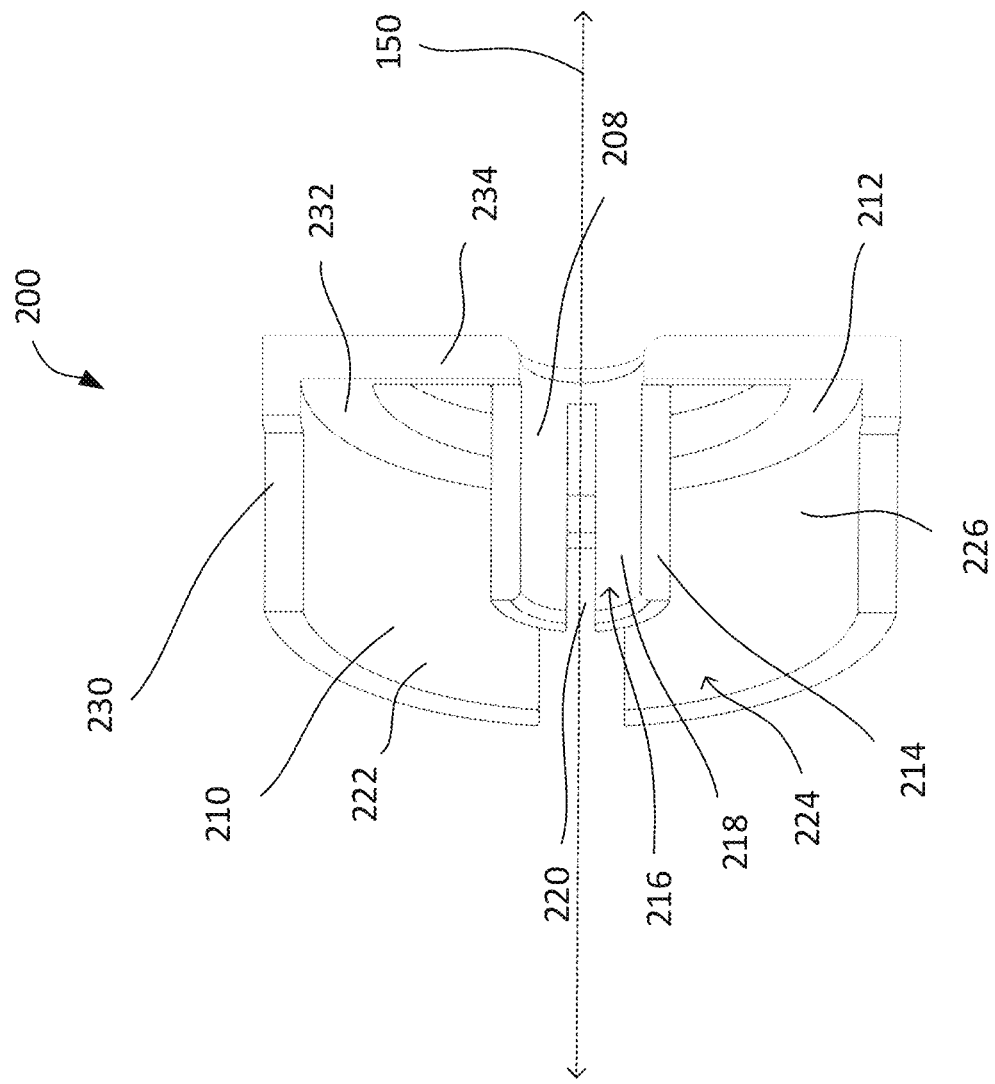
FIG. 3C shows a cross-sectional view of the example mechanical joint shown in FIGS. 2A and 2B.
Figure 3D:
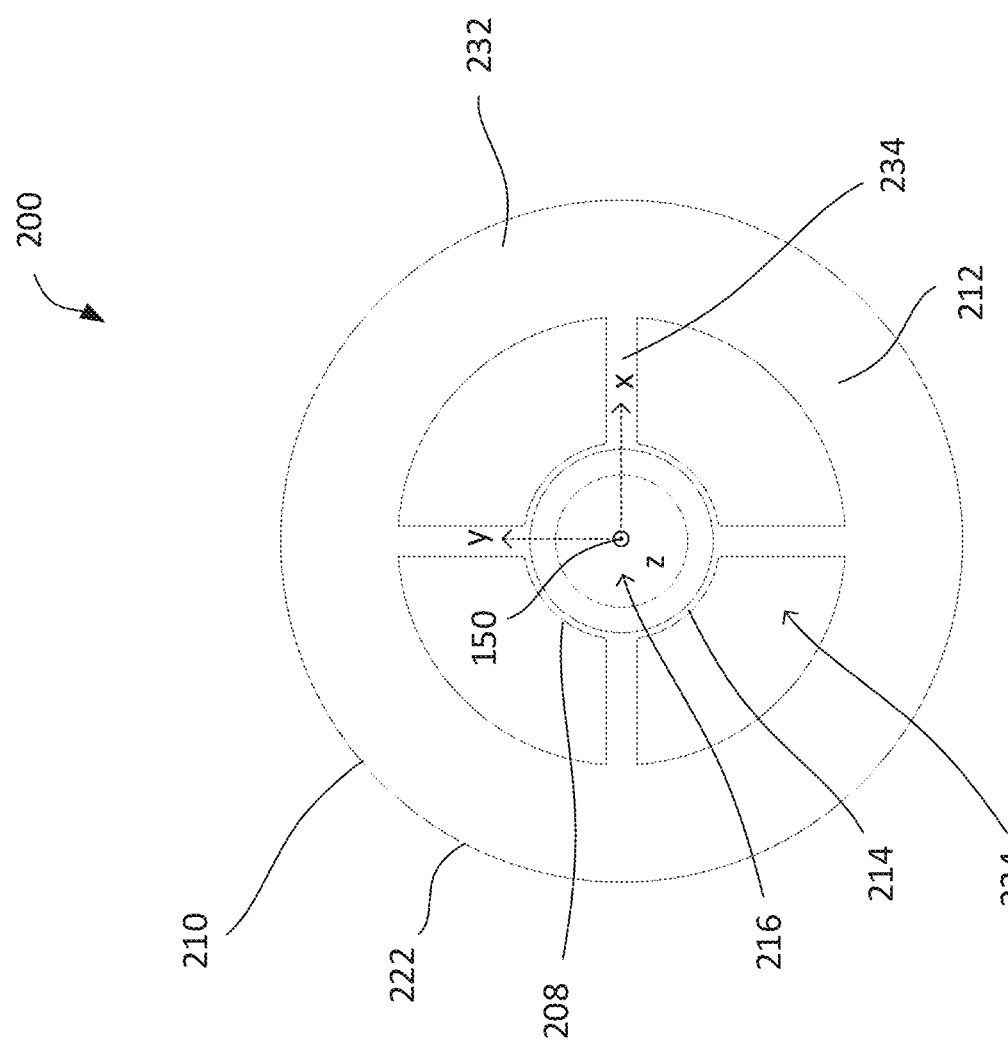
FIG. 3D shows a top view of the example mechanical joint shown in FIGS. 2A and 2B.

FIGS. 2A and 2B show a perspective view (FIG. 2A) and a cross-sectional view (FIG. 2B) of an example actuator 114, an example waveguide 106, and an example mechanical joint 200. For ease of illustration, portions of the actuator 114 have been omitted. FIGS. 3A-3D show the mechanical joint 200 according to a front perspective view (FIG. 3A), a rear perspective view (FIG. 3B), a cross-sectional view (FIG. 3C), and a top view (FIG. 3D).

The actuator 114 extends along a longitudinal axis 150. The actuator 114 has a tube-like configuration, and includes an outer wall 204 encircling a hollow inner channel 206. The actuator 114 has a circular or substantially circular cross-section. In some cases, the actuator 114 is a piezoelectric tube actuator.

The waveguide 106 is threaded through the inner channel 206 of the actuator 114, and extends along the longitudinal axis 150. The waveguide 106 is mechanically coupled to the actuator 114 via the mechanical joint 200, such that a force induced by actuator 114 (e.g., due to vibrations generated by the actuator 114 along its outer wall 204) is coupled to the waveguide 106. The waveguide 106 can be an optical fiber (e.g., a single mode optical fiber).

The mechanical joint 200 includes a neck portion 208, a collar portion 210, and a flexural element portion 212. In some cases, the mechanical joint 200 can be implemented as an integral component. In some cases, the mechanical joint 200 can be constructed from two or more discrete components.

The neck portion 208 is configured to attach to waveguide 106, such that the mechanical joint and the waveguide 106 are mechanically coupled. In some cases, the neck portion 208 can be mechanically and/or chemically attached to the waveguide 106. For example, the neck portion 208 can be attached to the waveguide 106 through metallization or diffusion. As another example, the neck portion 208 can be attached to the waveguide 106 through the use of urethanes, epoxies, or nanoparticles.

The neck portion 208 extends along the longitudinal axis 150. The neck portion 208 has a tube-like configuration, and includes an outer wall 214 encircling a hollow inner channel 216.

The inner channel 216 is dimensioned to receive the waveguide 106. In some cases, the cross-sectional shape of the inner channel 216 can be identical or substantially identical as that of the waveguide 106. For example, the if the cross-sectional shape of the waveguide 106 is circular or substantially circular, the inner channel 216 also can be have a circular or substantially circular cross-section. In some cases, the diameter of the inner channel 216 can be substantially the same as the diameter of the waveguide 106, such that the waveguide 106 securely contacts an inner surface 218 of the outer wall 214 facing the longitudinal axis 150 (e.g., through a friction fit).

In some cases, the neck portion 208 can include one or more slots along the outer wall 214. For example, as shown in FIGS. 3A-3C, the neck portion 208 can include several slots 220 that extend through the outer wall 214. Each slot 220 can each extend partially or entirely along the neck portion 208. The slots 220 can be beneficial, for example, in facilitating flexure of the mechanical joint 200. As shown in FIGS. 3A-3C, the slots 220 can be evenly azimuthally spaced about the longitudinal axis 150. Although four slots 220 are shown in FIGS. 2A and 3A-3C, in practice, the neck portion 208 can include any number of slots (e.g., one, two, three, or more slots), or no slots at all.

The collar portion 210 is configured to mechanically couple to the actuator 114. The collar portion 210 extends along the longitudinal axis 150. The collar portion 210 has a tube-like configuration, and includes an outer wall 222 encircling a hollow inner channel 224.

The inner channel 224 is dimensioned to receive the actuator 114. In some cases, the cross-sectional shape of the inner channel 224 can be identical or substantially identical as that of the actuator 114. For example, the if the cross-sectional shape of the actuator 114 is circular or substantially circular, the inner channel 224 also can be have a circular or substantially circular cross-section. In some cases, the diameter of the inner channel 224 can be substantially the same as the diameter of the actuator 114, such that the actuator 114 securely contacts an inner surface 226 of the outer wall 222 facing the longitudinal axis 150 (e.g., through a friction fit). In some cases, the diameter of the inner channel 224 can be larger than the diameter of the actuator 114, such that a gap region 228 is defined between the inner surface 226 of the outer wall 222 and the actuator 114.

In some cases, the collar portion 210 can include one or more slots along the outer wall 222. For example, as shown in FIGS. 2A and 3A-3C, the collar portion 210 can include several slots 230 that extend through the outer wall 222. Each slot 230 can each extend partially or entirely along the collar portion 210. The slots 230 can be beneficial, for example, in facilitating flexure of the mechanical joint 200. Although four slots 230 are shown in FIGS. 2A and 3A-3C, in practice, the collar portion 210 can include any number of slots (e.g., one, two, three, or more slots), or no slots at all.

The flexural element portion 212 is configured to mechanically couple the neck portion 208 to the collar portion 210, such that forces imparted onto the collar portion 210 (e.g., due to vibrations generated by the actuator 114)

are coupled to the neck portion 208. In some cases, portions of flexural element portion 212 or an entirety of the flexural element portion 212 can bend with respect to the neck portion 208 and/or the collar portion 210, such that the neck portion 208 and the collar portion 210 are not rigidly coupled together.

The flexural element portion 212 can include various structures extending between the neck portion 208 and the collar portion 210. For example, as shown in FIGS. 2A-2D and 3A-3D, the flexural element portion 212 can include an annular portion 232 (e.g., a flange or rim) and beam 234 extending between and interconnecting the neck portion 208 and the collar portion 210. Although four beams 234 are shown in FIGS. 2A, 3A, and 3D, in practice, the flexural element portion 212 can include any number of beam 234 (e.g., one, two, three, or more slots). In some cases, the flexural element portion 212 can have no beams at all, and the annular portion 232 alone can extend along from the neck portion 208 to the collar portion 210. Further still, in some cases, the flexural element portion 212 does not include an annular portion 232 at all (e.g., each of the beams 234 can extend from the neck portion 208 directly to the collar portion 210). Other configurations also can be used to vary the stiffness of the flexural element portion 212.

In some cases, the mechanical joint 200 can be rotationally symmetric about the longitudinal axis 150. In some cases, the mechanical joint 200 can have at least four-fold rotational symmetry about the longitudinal axis 150.

In some cases, the mechanical joint 200 can have directionally dependent stiffness. For example, referring to FIG. 3D, the mechanical joint 200 can have a first translational stiffness $k_z$ with respect to the longitudinal axis 150 (i.e., the z-axis), a second translational stiffness $k_x$ with respect to the x-axis, and a third translational stiffness $k_y$ with respect to the y-axis (where the x, y, and z axes refer to the axes of a Cartesian coordinate system). The first translational stiffness $k_z$ can be different than each of the second translational stiffness $k_x$ and the third translational stiffness $k_y$. For example, the first translational stiffness $k_z$ can be greater than each of the second and third translational stiffnesses $k_x$ and $k_y$. Further, in some cases, the second translational stiffness $k_x$ and the third translational stiffness $k_y$ can be substantially the same.

Further, the mechanical joint 200 can have a first rotational stiffness $k_{\theta x}$ about the x-axis, a second rotational stiffness $k_{\theta y}$ about the y-axis. The first and second rotational stiffnesses $k_{\theta x}$ and $k_{\theta y}$ can be substantially the same, and each rotational stiffness can be less than the first translational stiffness $k_z$.

This combination of stiffnesses can be useful, for example, as it enables the mechanical joint 200 to couple force from the actuator 114 uniformly with respect to the x-y plane, such that the waveguide 106 less likely to exhibit directionally-dependent bias with respect to the x-y plane during operation of the actuator 114. Thus, the waveguide 106 is more likely to travel along a predictable predefined scan pattern, thereby improving the projected image quality. Further, as the first translation stiffness $k_z$ is relatively large, the waveguide 106 is less along to translate along the z-axis, while still enabling it vibrate with respect to the x and y axes.

Further still, in some cases, the stiffnesses can be modified to vary the behavior of the waveguide 106 (e.g., to increase or decrease the deflection angle of the waveguide tip 108 during operation of the actuator 114 and/or to change the natural or resonant frequency of the waveguide tip 108 during operation). Thus, the performance of the FSD device 100 can be adjusted by modifying the stiffnesses of the mechanical joint 200. In some cases, the mechanical joint 200 enables the waveguide tip 108 to scan a pattern at a frequency of approximately 10 kHz to 150 kHz and to achieve a diametral deflection between 600 μm and 1800 μm (e.g., the tip 108 of traverses a circular or substantially circular path having a diameter between 600 μm and 1800 μm). Other performance characteristics are also possible, depending on the implementation.

As examples, in some cases, a typical radial translation stiffness can be between 0.375 N/mm and 6.0 N/mm, with a buckling mode stiffness between 1.7 N/mm and 28 N/mm. In some cases, a typical axial translation stiffness can be between 1.2 N/mm and 20.0 N/mm, with a buckling mode stiffness between 20.0 N/mm and 360.0 N/mm. In some cases, a typical rotational stiffness can be between 0.1 N*mm/Rad and 1.6 N*mm/Rad, with a buckling mode stiffness between 0.15 N*mm/Rad and 2.5 N*mm/Rad.

Figure 4A:
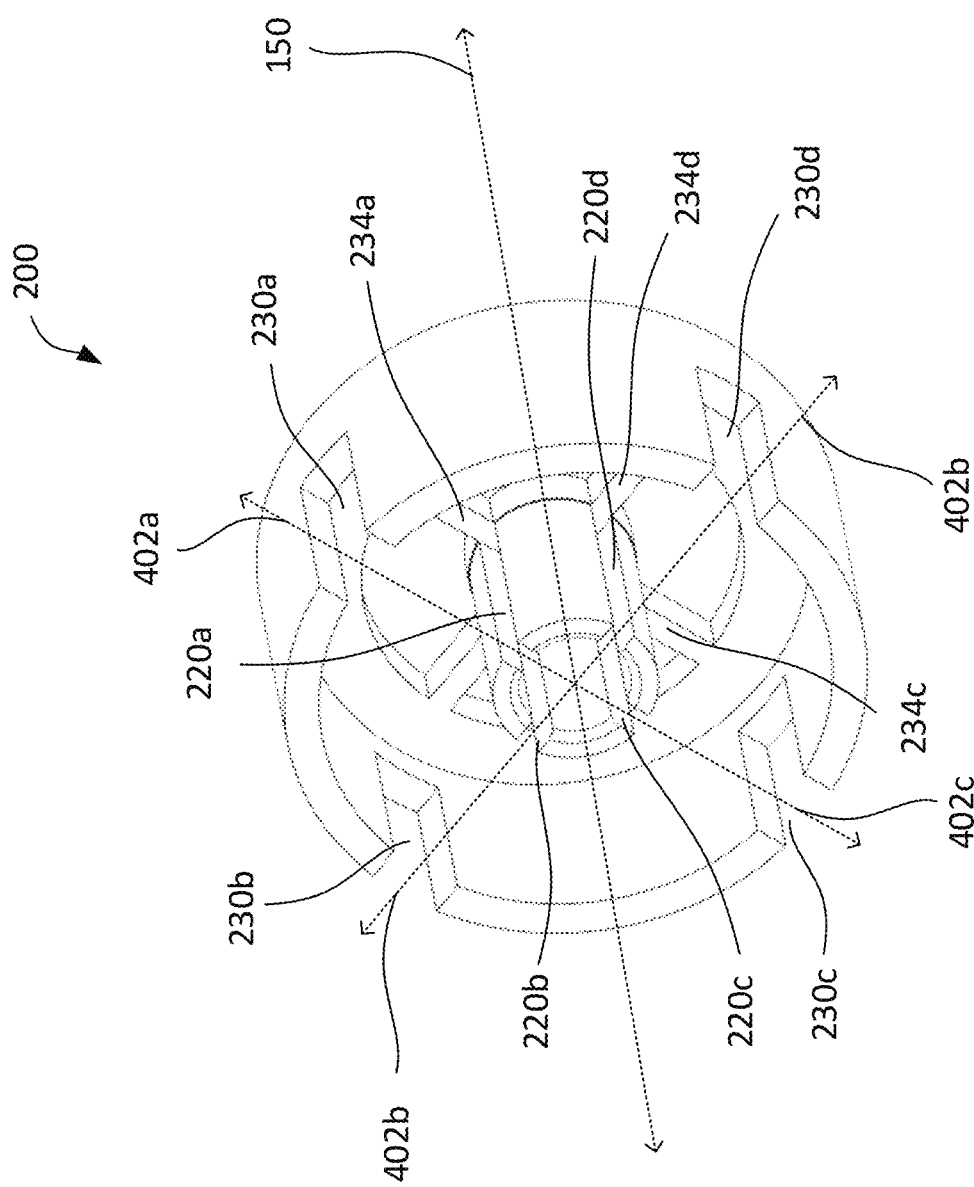
FIG. 4A shows a rear perspective view of the example mechanical joint shown in FIGS. 2A and 2B.
Figure 4B:
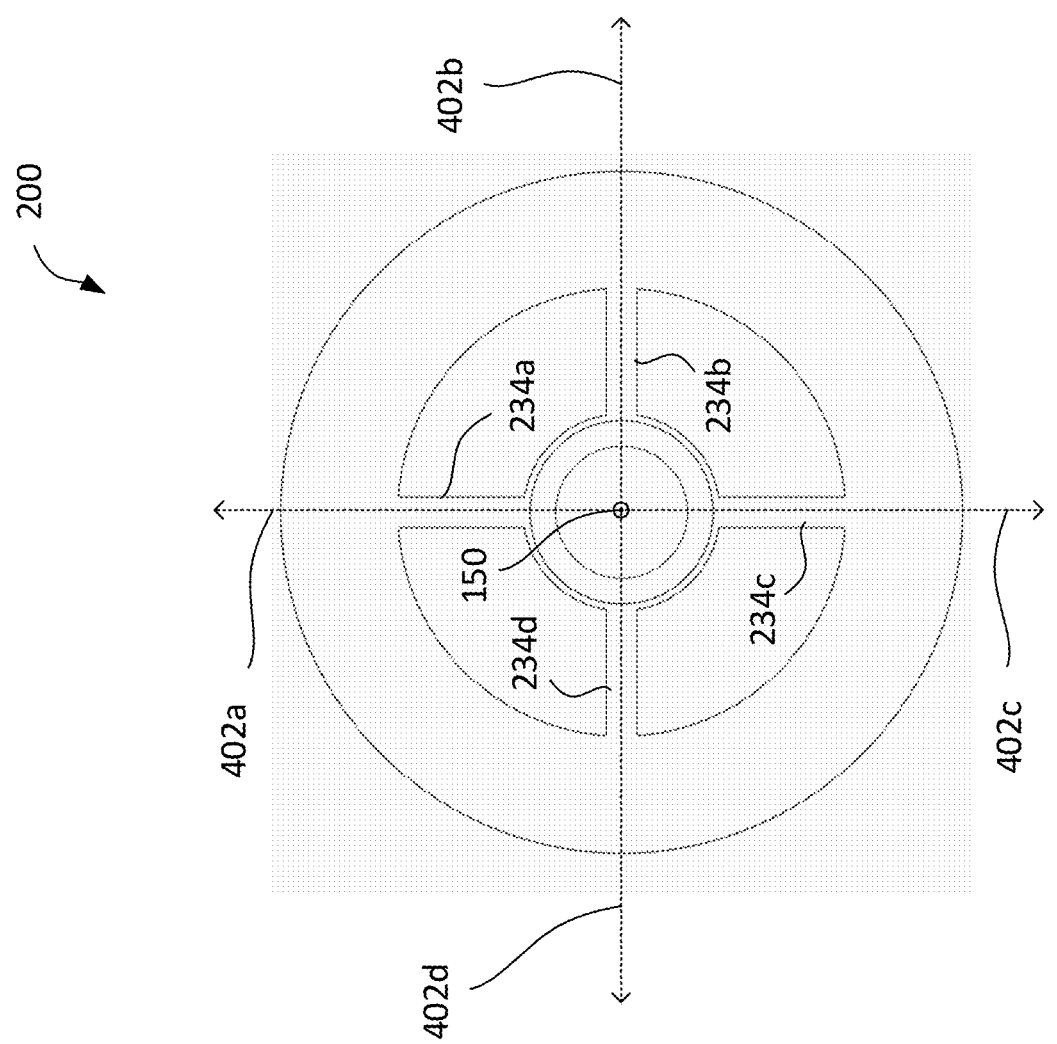
FIG. 4B shows a top view of the example mechanical joint shown in FIGS. 2A and 2B.

In some cases, each slot 220 can be radially aligned with a corresponding slot 230 and a corresponding beam 234. For example, as shown in FIGS. 4A and 4B, a first slot 220a, a first slot 230a, and a first beam 234a are each disposed at a first radial direction 402a with respect to the longitudinal axis 150. Further, a second slot 220b, a second slot 230b, and a second beam 234b are each disposed at a second radial direction 402b with respect to the longitudinal axis 150. Further, a third slot 220c, a third slot 230c, and a third beam 234c are each disposed at a third radial direction 402c with respect to the longitudinal axis 150. Further, a fourth slot 220d, a fourth slot 230d, and a fourth beam 234d are each disposed at a fourth radial direction 402d with respect to the longitudinal axis 150.

Further, the directions can be evenly azimuthally spaced around the longitudinal axis 150. For example, as shown in FIGS. 4A and 4B, the radial directions 402a-d are azimuthally spaced in 90° increments with respect to the longitudinal axis 150.

Figure 4C:
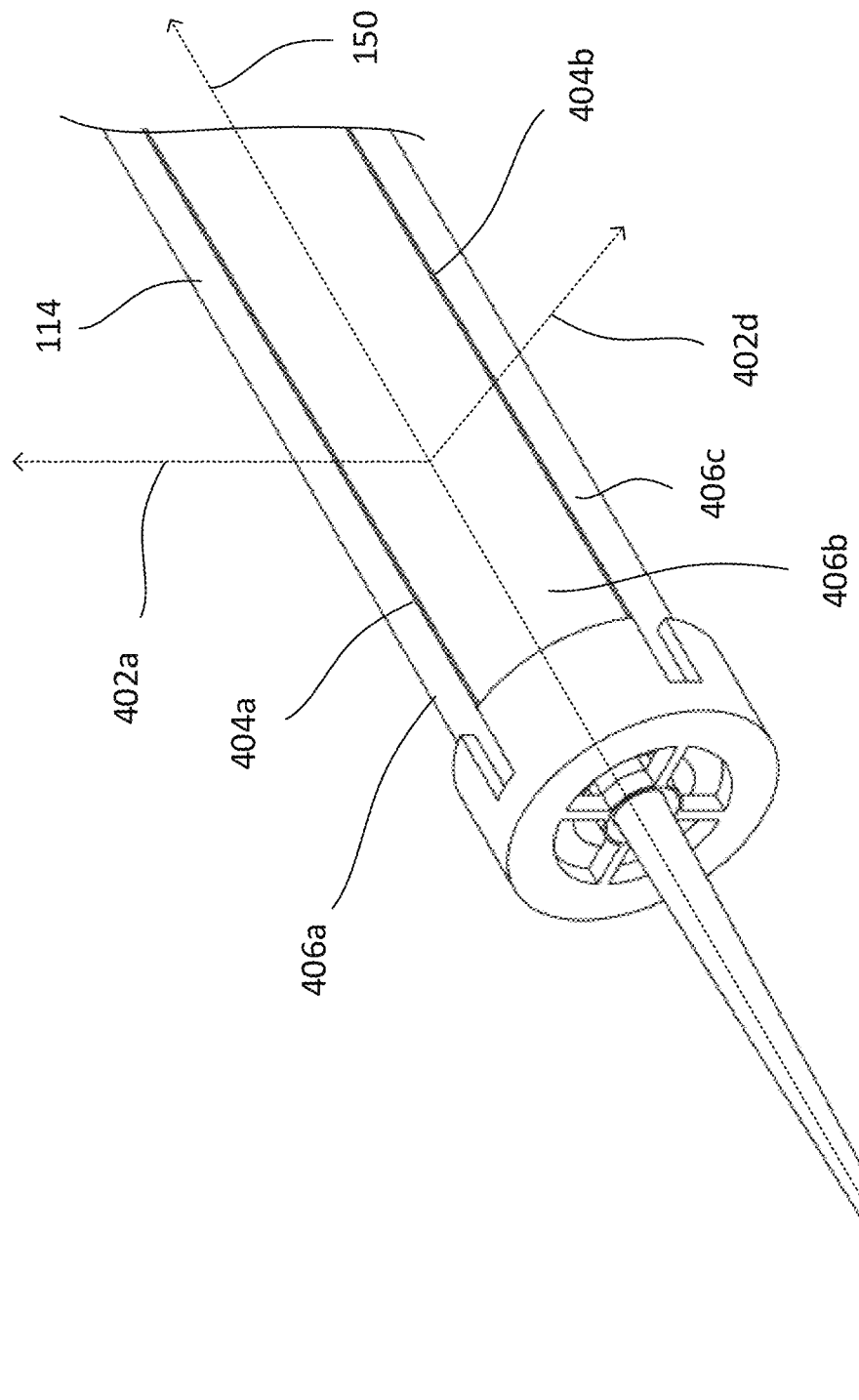
FIG. 4C shows a perspective view of the example actuator, the example waveguide, and the example mechanical joint shown in FIG. 2A.

In some cases, the radial directions 402a-d can each align with a respective piezoelectric element of the actuator 114. For instance, in the example shown in FIG. 4C, the actuator 114 includes four lines of piezoelectric elements (e.g., piezo-ceramic elements) that are evenly azimuthally spaced about the longitudinal axis 150, and electrode plates disposed between adjacent piezoelectric elements (due to the perspective view of FIG. 4C, only two piezoelectric elements 404a and 404b, and three electrode plates 406a-c are shown). As shown in FIG. 4C, the first radial direction 402a can be radially aligned with a first piezoelectric element 404a, and the second radial direction 402b can be radially aligned with a second piezoelectric element 404b. Similarly, the third radial direction 402c and the fourth radial direction 402d can each be radially aligned with a third piezoelectric element and a fourth piezoelectric element, respectively.

This configuration can be useful, for example, to define the axes of motion of the FSD device 100 and/or to reduce directionally-dependent bias with respect to the x-y plane during operation of the actuator 114.

Although an example configuration of a mechanical joint 200 is shown in FIGS. 2A, 2B, 3A-3D, and 4A-4C, this is merely an illustrative example. In practice, the configuration of a mechanical joint can differ, depending on the application (e.g., to accommodate differently sized actuators and/or waveguides, to provide different stiffness properties, to provide different waveguide deflection characteristics, etc.).

Figure 5A:
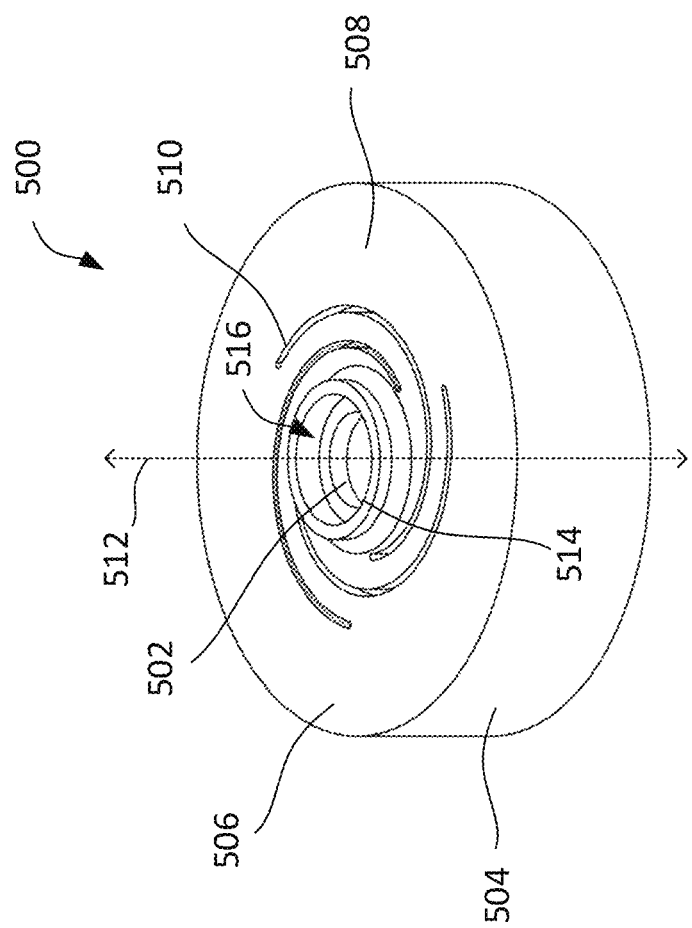
FIG. 5A shows a perspective view of another example mechanical joint.
Figure 5B:
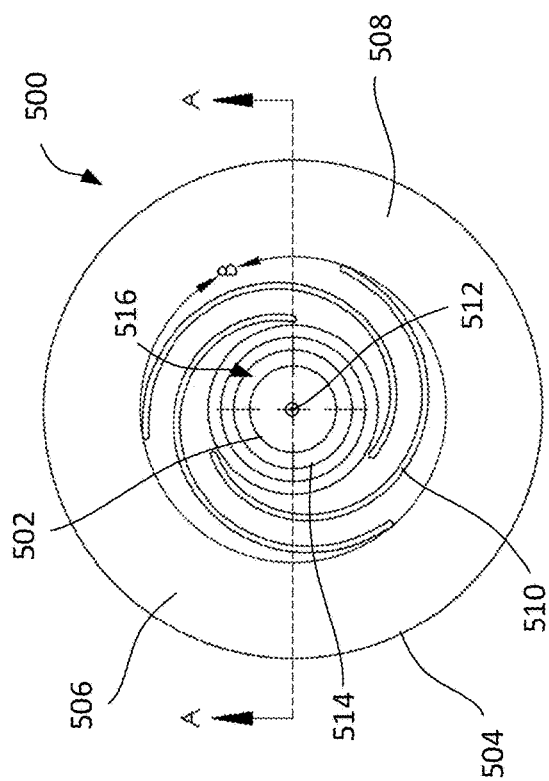
FIG. 5B shows a top view of the mechanical joint shown in FIG. 5A.
Figure 5C:
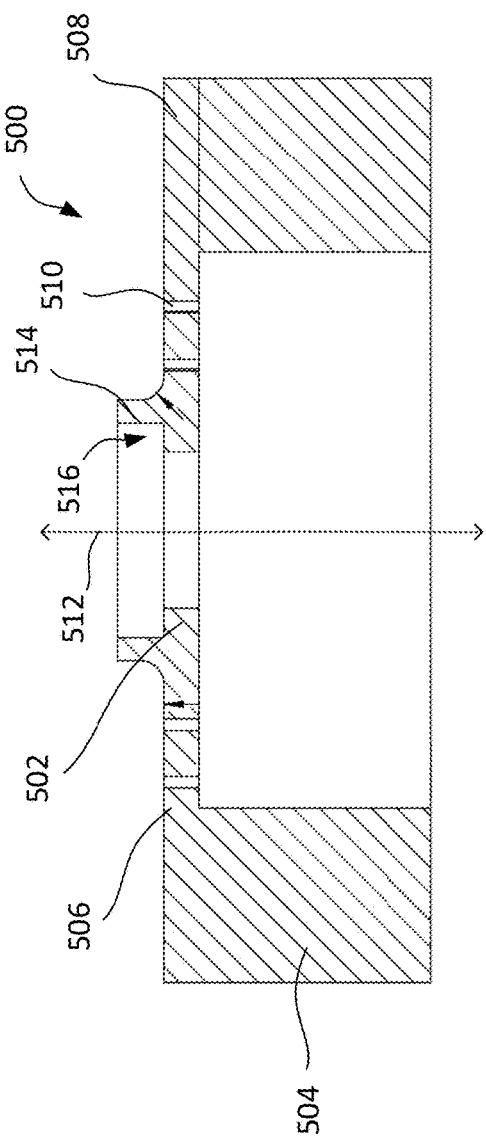
FIG. 5C shows a cross-sectional view of the mechanical joint shown in FIG. 5A.

As an example, FIGS. 5A-5C show another mechanical joint 500. FIG. 5A shows a perspective view of the mechanical joint 500, FIG. 5B shows a top view of the mechanical joint 500, and FIG. 5C shows a cross-sectional view of the mechanical joint 500 along the plane A.

The mechanical joint 500 is similar in some respects to the mechanical joint 200. For example, the mechanical joint 500 includes a neck portion 502, a collar portion 504, and a flexural element portion 506. The neck portion 502 is configured to mechanically couple to a waveguide (e.g., the waveguide 106) through a mechanical and/or chemical attachment between them. Further, the collar portion 504 is configured to mechanically couple to an actuator (e.g., the actuator 114). Further, the flexural element portion 506 is configured to mechanically couple the neck portion 502 to the collar portion 504, such that forces imparted onto the collar portion 504 (e.g., due to vibrations generated by an actuator) are coupled to the neck portion 502.

The flexural element portion 506 also includes an annular portion 508 (e.g., a flange or rim) extending between and interconnecting the neck portion 502 and the collar portion 504. A number of slots can be defined on the annular portion 508. For example, as shown in FIGS. 5A-5C, three slots 510 can be defined on the annular portion 508, each extending spirally outward from the neck portion 502. The slots 510 can be rotationally symmetrically defined about the longitudinal axis 512 of the mechanical joint 500 (e.g., each slot 510 can be rotationally offset from an adjacent slot 510 by 120°). Although three slots 510 are shown in FIGS. 5A-5C, this is merely an illustrative example. In practice, a mechanical joint can include any number of slots 510 (e.g., one, two, three, four, or more).

Further, as shown in FIG. 5B, the slots 510 are confined within a notional circle B. In practice, the size of the circle B can differ, such that the slots 510 occupy a greater or lesser area of the annular portion 508.

Further, as shown in FIGS. 5A and 5C, the mechanical joint 500 also includes a hub step structure 514. The hub step structure 514 extends outward from the flexural element portion 506, and encircles the neck portion 502, forming a step or indentation 516. The hub step structure 514 can be useful, for example, in providing additional stiffness to the mechanical joint 500.

Figure 6A:
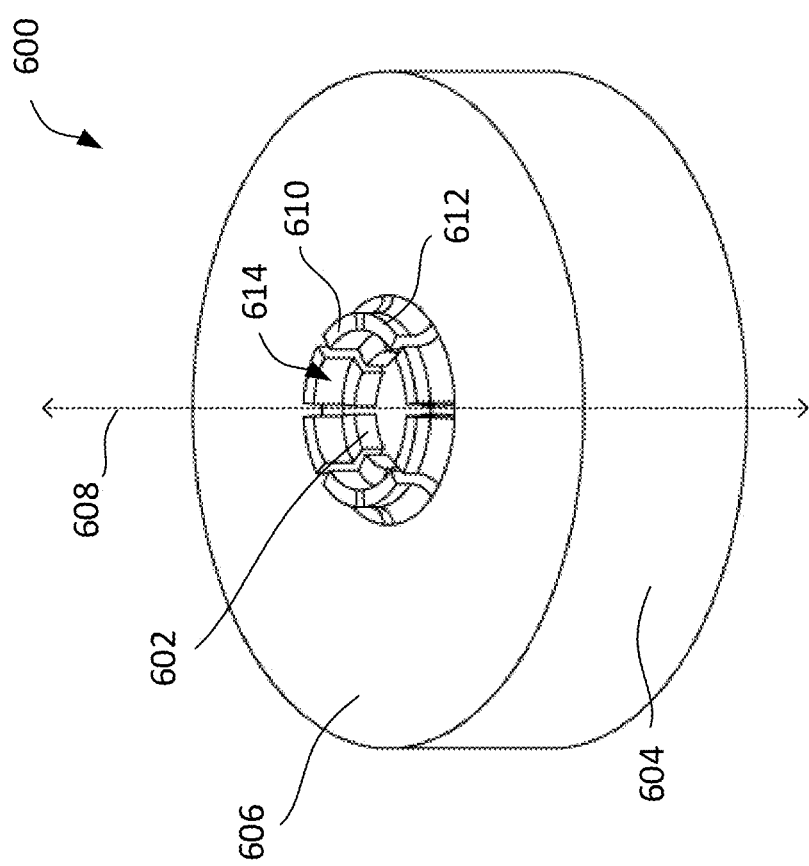
FIG. 6A shows a perspective view of another example mechanical joint.

FIGS. 6A-6C show another example mechanical joint 600. FIG. 6A shows a perspective view of the mechanical joint 600, FIG. 6B shows a top view of the mechanical joint 600, and FIG. 6C shows a cross-sectional view of the mechanical joint 600 along the plane A.

The mechanical joint 600 is similar in some respects to the mechanical joint 200. For example, the mechanical joint 600 includes a neck portion 602, a collar portion 604, and a flexural element portion 606. The neck portion 602 is configured to mechanically couple to a waveguide (e.g., the waveguide 106) through a mechanical and/or chemical attachment between them. Further, the collar portion 604 is configured to mechanically couple to an actuator (e.g., the actuator 114). Further, the flexural element portion 606 is configured to mechanically couple the neck portion 602 to the collar portion 604, such that forces imparted onto the collar portion 604 (e.g., due to vibrations generated by an actuator) are coupled to the neck portion 602.

The mechanical joint 600 also includes a hub step structure 610. The hub step 610 structure includes several finger structures 612, each extending outward from the flexural element portion 606. For example, as shown in FIGS. 6A and 6B, the mechanical joint 600 can include eight finger structures 612 that protrude from the flexural element portion 606 and encircle the neck portion 602. The finger structures 612 can be rotationally symmetrically disposed about the longitudinal axis 608 of the mechanical joint 600 (e.g., each finger structure 612 can be rotationally offset from an adjacent finger structure 612 by 45°). Although eight finger structures 612 shown in FIGS. 6A-6C, this is merely an illustrative example. In practice, a mechanical joint can include any number of finger structures 612 (e.g., one, two, three, four, or more).

Further, the finger structure 612 form a step or indentation 614. In a similar manner as described with respect to FIGS. 5A-5C, the hub step structure 610 can be useful, for example, in providing additional stiffness to the mechanical joint 600.

Figure 7A:
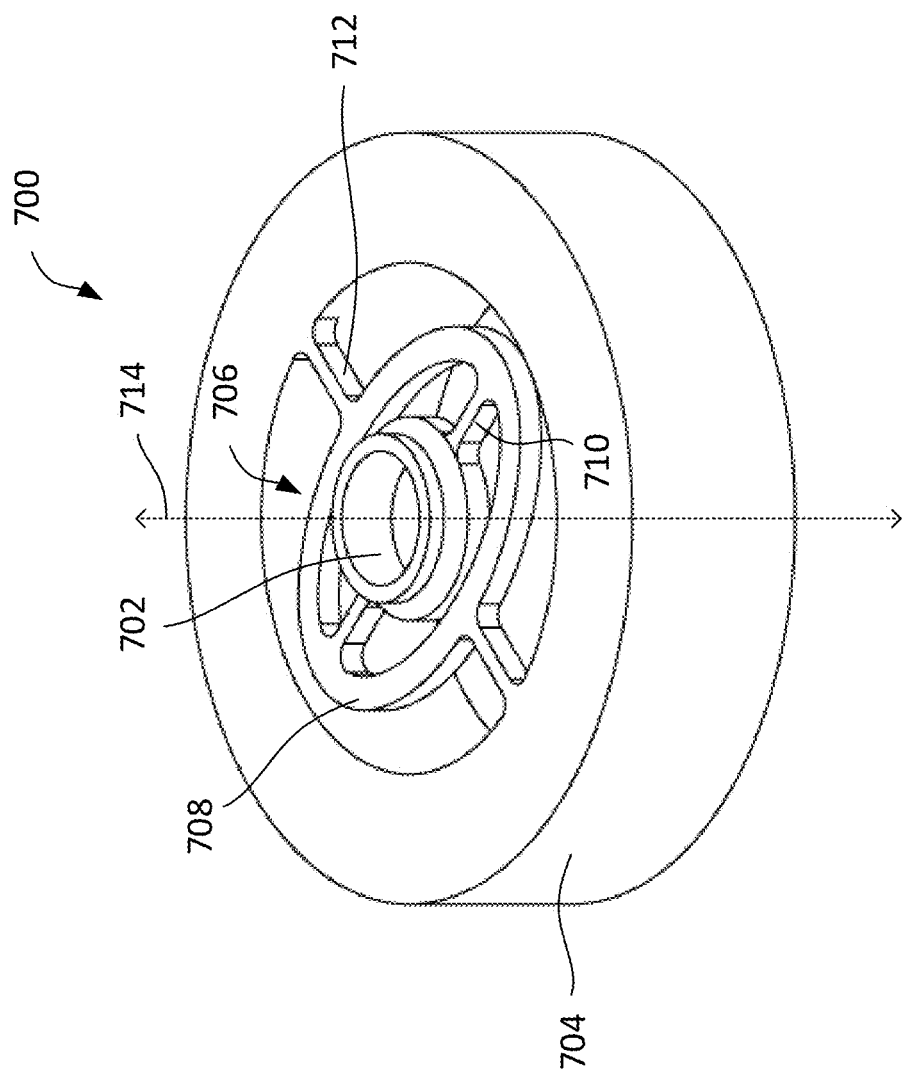
FIG. 7A shows a perspective view of another example mechanical joint.
Figure 7B:
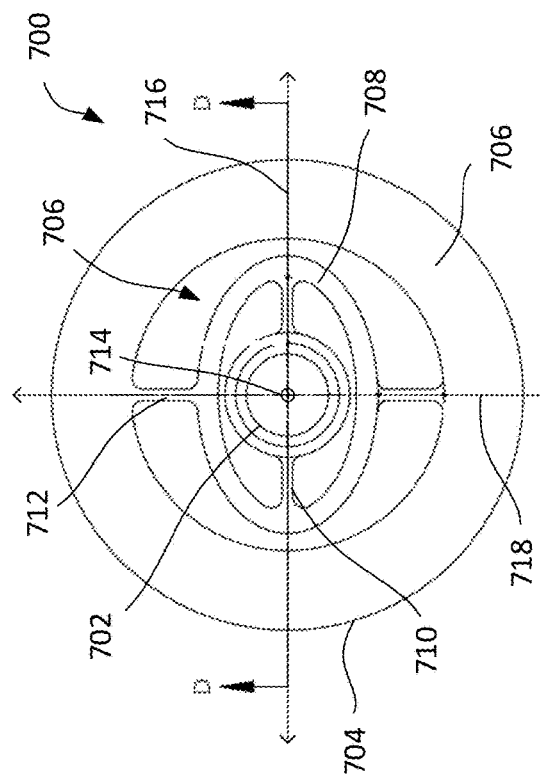
FIG. 7B shows a top view of the mechanical joint shown in FIG. 7A.
Figure 7C:
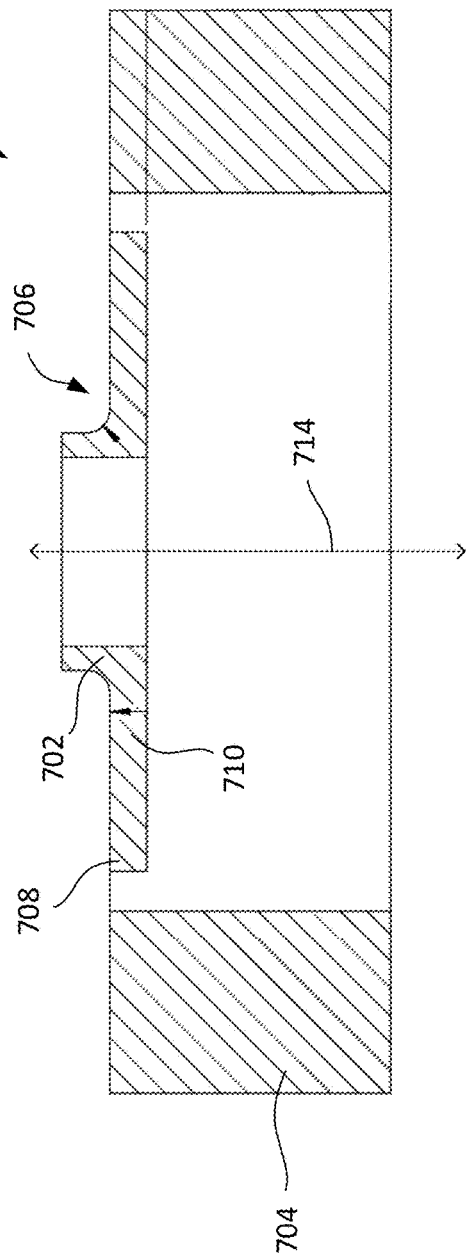
FIG. 7C shows a cross-sectional view of the mechanical joint shown in FIG. 7A.

FIGS. 7A-7C show another example mechanical joint 700. FIG. 7A shows a perspective view of the mechanical joint 700, FIG. 7B shows a top view of the mechanical joint 700, and FIG. 7C shows a cross-sectional view of the mechanical joint 700 along the plane D.

The mechanical joint 700 includes a neck portion 702, a collar portion 704, and a gimbal structure 706. The neck portion 702 is configured to mechanically couple to a waveguide (e.g., the waveguide 106) through a mechanical and/or chemical attachment between them. Further, the collar portion 704 is configured to mechanically couple to an actuator (e.g., the actuator 114).

Further, the gimbal structure 706 is configured to mechanically couple the neck portion 702 to the collar portion 704, such that forces imparted onto the collar portion 704 (e.g., due to vibrations generated by an actuator) are coupled to the neck portion 702. The gimbal structure 706 includes a ring 708, inner beams 710 mechanically coupling the ring 708 to the neck portion 702, and outer beams 712 mechanically coupling the ring 708 to the collar portion 704.

As shown in FIG. 7B, the ring 708 is ovular in shape, and is centered about a longitudinal axis 714 of the mechanical joint 700. The inner beams 710 extend inward from the inner periphery of the ring 708 along the major axis 716 of the ring 708. The outer beams 712 extend outward from the outer periphery of the ring 708 along the minor axis 718 of the ring 708. Further, the major axis 716 is orthogonal to the minor axis 718. Thus, the inner beams 710 and the outer beams 712 are rotationally from one another by 90°.

The gimbal structure 706 enables the neck portion 702 to rotate with respect to the collar portion 704 substantially about two discrete axes of rotation (e.g., about the major axis 716 and about the minor axis 718). For example, as the ring 708 is mechanically coupled to the collar portion 704 through the outer beams 712, the ring 708 can rotate relative to the collar portion 704 about minor axis 718. This rotation, in turn, similarly rotates the neck portion 702 relative to the collar portion 704 about the minor axis 718. Further, as the ring 708 is mechanically coupled to the neck portion 702 through the inner beams 710, the neck portion 702 can rotate relative to the ring 708 about the major axis 716.

This arrangement confines the movement of the neck portion 702 relative to the collar portion 704 along a discrete number of rotational axes. This can be useful, for example, in improving the operational characteristics of the mechanical joint (e.g., by eliminating or otherwise reducing errant movement along other axes of rotation).

Although example mechanical joints are depicted herein, it is understood that they are not necessarily drawn to scale. In practice, the dimensions of each structure of a mechanical joint can vary, depend on the application. As examples, various dimensions of a mechanical joint are described below. However, it is understood that, in practice, other dimensions are also possible.

In some cases, an inner diameter of a collar portion can be between 500 μm and 1500 μm (e.g., 502 μm, 612 μm, 804

μm, 940 μm, or 1242 μm). In some cases, an outer diameter of a collar portion can be between 800 μm and 2000 μm (e.g., 802 μm, 912 μmm 802 μm, 912 μm, 1104 μm, 1214 μm, 1240 μm, and 1542 μm).

In some cases, an inner diameter of a neck portion can be between 20 μm and 200 μm (e.g., 26 μm, 72 μm, 82 μm, 84 μm, 102 μm, 127 μm, 129 μm, 140 μm, 185 μm, 204 μm, 260 μm, and 556 μm). In some cases, an outer diameter of a neck portion can be 300 μm or less (e.g., 300 μm, 150 μm, 100 μm, and 50 μm).

In some cases, an inner diameter of a hub step structure can be between 50 μm and 1000 μm (e.g., 84 μm, 127 μm, 129 μm, 130 μm, 160 μm, 185 μm, 190 μm, 204 μm, 260 μm, and 556 μm). In some cases, a diametrical thickness of a hub step structure can be between 10 μm and 60 μm (e.g., 20 μm and 50 μm).

In some cases, a thickness of a flexural element portion can be between 20 μm and 60 μm (e.g., 30 μm and 50 μm).

In some cases, a thickness of an inner beam of a gimbal structure (e.g., in a direction orthogonal to the longitudinal axis of the mechanical joint) can be between 5 μm and 50 μm (e.g., 10 μm and 15 μm). In some cases, a thickness of an outer beam of a gimbal structure (e.g., in a direction orthogonal to the longitudinal axis of the mechanical joint) can be between 5 μm and 50 μm (e.g., 11 μm and 17 μm). In some cases, the length of an outer beam of a gimbal structure (e.g., in another direction orthogonal to the longitudinal axis of the mechanical joint) can be between 50 μm and 150 μm (e.g., 100 μm and 125 μm).

In some cases, a thickness of a spirally extending slot defined along a flexural element portion can be between 10 μm and 100 μm (e.g., 18 μm, 21 μm, 22 μm, 26 μm, 28 μm, 32 μm, 35 μm, 72 μm, 78 μm, 81 μm). In some cases, spirally extending slots can be parametrically defined by the equations: $x(t)=(A_1+B_1*T*\pi/180)*(\cos(T*\pi/180)/1000$ and $y(t)=(A_1+B_1*T*\pi/180)*(\sin(T*\pi/180)/1000$, where $0 \leq T \leq \theta_f$. $A_1$ can be between 100 μm and 200 μm (e.g., 102 μm, 108 μm, 111 μm, 124 μm, 125 μm, 129 μm, 135 μm, 175 μm, 181 μm). $B_1$ can be between 10 μm and 100 μm (e.g., 23 μm, 24 μm, 25 μm, 28 μm, 30 μm, 31 μm, 32 μm, 52 μm, and 53 μm). $\theta_f$ can be between 200 and 350° (e.g., 220°, 262°, 272°, 277°, 278°, 279°, 296°, 299°, 301°, 304°, 315°).

Further, although various structures are depicted herein, it is understood that various features can be combined onto a single mechanical joint, and/or excluded from a mechanical joint. As an example, a mechanical joint can include one or more of spirally extending slots defined on a flexural element portion (e.g., as shown in FIGS. 5A-5C), a hub step structure (e.g., as shown in FIGS. 5A-5C and 6A-6C), a hub step structure having finger structures (e.g., as shown in FIGS. 6A-6C), a gimbal structure (e.g., as shown in FIGS. 7A-7C), slots defined on a collar portion (e.g., as shown in FIG. 3B), slots defined on a neck portion (e.g., as shown in FIG. 3B), or any combination thereof.

A mechanical joint can be constructed using various materials. For example, in some cases, the mechanical joint can be constructed, either partially or entirely, of silicon. In some cases, the mechanical joint can be constructed using a crystalline silicon (e.g., silicon having a (111) crystal structure) and/or an amorphous silicon. In some cases, the mechanical joint can be constructed using one or more layers of silicon and/or one or more layers of an electrically insulative material (e.g., silicon dioxide).

In some cases, a mechanical joint can be constructed using semiconductor microfabrication techniques. A simplified example is shown in FIGS. 8A-8C.

Figure 8A:
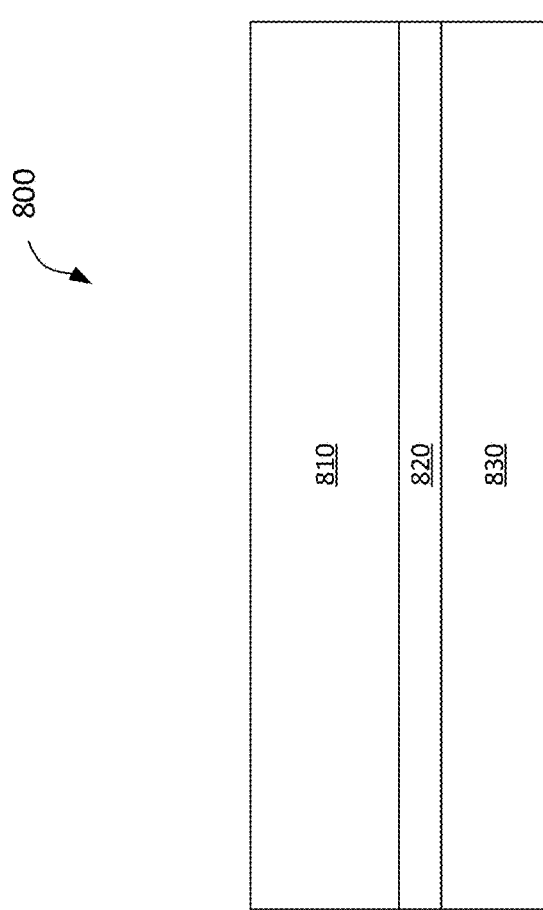
FIGS. 8A-8C show an example microfabrication process for producing mechanical joints.
Figure 8B:
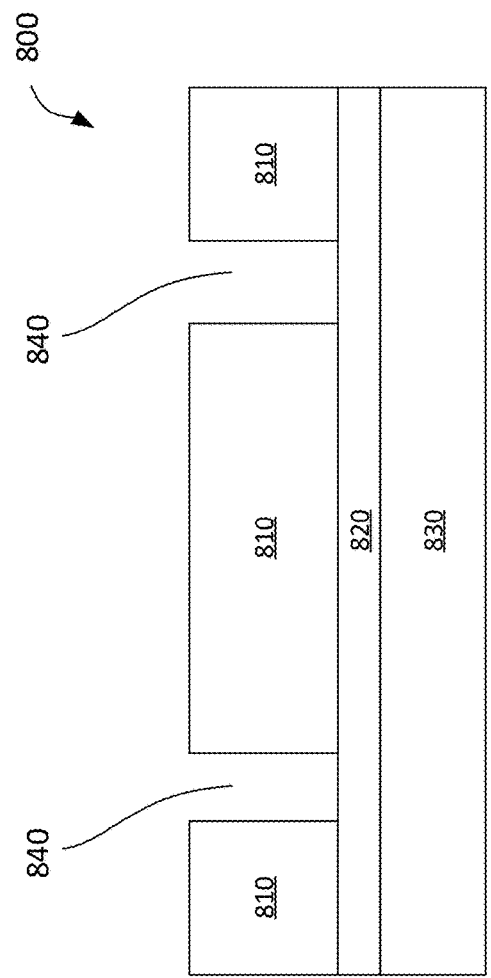
Figure 8C:
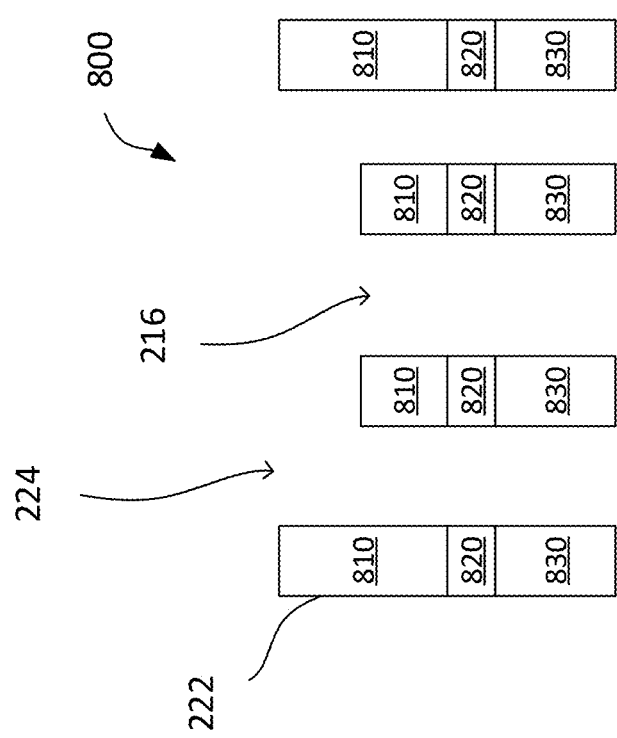

As an example, FIG. 8A shows a cross-sectional view of a wafer 800. The wafer 800 includes a device layer 810 (e.g., a layer of silicon), a buried oxide layer 820 (e.g., a layer of silicon dioxide), and a handle layer 830 (e.g., a layer of silicon). These layers can be formed, for example, by depositing each of the layers in succession onto a substrate (e.g., using oxidation, physical vapor deposition, chemical vapor deposition, electroplating, spin casting, or other layer deposition techniques).

One or more features can be defined on the wafer 800 by selectively adding and/or removing material from the wafer 800. For example, as shown in FIG. 8B, material can be etched from the wafer 800 to define channels 840.

Material from the wafer 800 can be added and/or removed in such a way that the remaining material forms the mechanical joint. For example, as shown in FIG. 8C, material can be selectively removed along the periphery of the wafer 800, such that a substantially cylindrical portion of the wafer 800 remains, forming the outer periphery of the outer wall 222 of the collar portion 210 of the mechanical joint 200. Further, material can be selectively removed along the interior of the wafer 800 to define the inner channels 216 and 224. In a similar manner, additional material can be removed from the wafer 800 to define each of the other structures of the mechanical joint 200. As an example, wafer 800 can be etched using photolithography techniques (e.g., wet etching or dry etching, such as reactive-ion-etching and deep-reactive-ion etching).

Producing a mechanical joint using microfabrication techniques can provide various benefits. For example, in some cases, mechanical joints can be constructed precisely and consistently, and thus may be suitable for use in variation-specific applications (e.g., in imaging systems that may be highly sensitive to the properties of a mechanical joint, such as FSD devices). Further, mechanical joints can be readily mass produced. Further still, the design of mechanical joints can be readily modified and implemented, and thus can be readily used in a variety of different applications.

Although an example microfabrication process is shown FIGS. 8A-8C, this is merely a simplified example. In practice, other microfabrication techniques can be used to product a mechanical joint and/or to produce mechanical joints having different structural features that those shown herein. For example, similar techniques can also be used to form any other mechanical joint described herein (e.g., the mechanical joints 500, 600, and 700).

A number of embodiments have been described. Nevertheless, it will be understood that various modifications may be made without departing from the spirit and scope of the invention. Accordingly, other embodiments are within the scope of the following claims.

What is claimed is:

1. An apparatus, comprising:
    an optical fiber;
    an actuator configured to generate a force to vary an orientation of a first end of the optical fiber; and
    a joint mechanically coupling the actuator to the optical fiber, wherein the joint is configured to couple the force generated by the actuator to the optical fiber, and wherein the joint comprises:
        a neck extending along an axis, the optical fiber being threaded through an aperture extending along the axis through the neck, wherein the optical fiber is attached to the joint at a surface of the neck facing the axis, a collar extending along the axis, wherein the actuator is mechanically attached to the joint at an inner surface of the collar facing the axis, and a flexural element extending radially from the neck to the collar, wherein the flexural element comprises a plurality of beams extending from the neck to the collar.

2. An apparatus, comprising:

an optical fiber;

an actuator configured to generate a force to vary an orientation of a first end of the optical fiber; and a joint mechanically coupling the actuator to the optical fiber, wherein the joint is configured to couple the force generated by the actuator to the optical fiber, and wherein the joint comprises:

a neck extending along an axis, the optical fiber being threaded through an aperture extending along the axis through the neck, wherein the optical fiber is attached to the joint at a surface of the neck facing the axis, a collar extending along the axis, wherein the actuator is mechanically attached to the joint at an inner surface of the collar facing the axis, and a flexural element extending radially from the neck to the collar, wherein the joint has a first stiffness with respect to the axis, a second stiffness with respect to a first radial direction, and a third stiffness with respect to a second radial direction orthogonal the first radial direction, and wherein the first stiffness is greater than the second stiffness and the third stiffness.

3. The apparatus of claim 2, wherein the joint comprises crystalline silicon.

4. The apparatus of claim 3, wherein the crystalline silicon has a (111) crystal structure.

5. The apparatus of claim 2, wherein the joint comprises amorphous silicon.

6. The apparatus of claim 2, wherein the joint comprises one or more layers of silicon and one or more layers of electrically insulative material.

7. The apparatus of claim 2, further comprising an illumination source in optical communication with the optical fiber, wherein the illumination source is configured, during operation, to direct light into the optical fiber.

8. The apparatus of claim 7, wherein the actuator is configured, during operation, to vary the orientation of the portion of the optical fiber such that a first end of the optical fiber traverses a pre-defined pattern.

9. The apparatus of claim 8, wherein the optical guide is configured, during operation, to receive light from the illumination source, guide the received light to an end of the optical fiber, and emit the received light from the first end of the optical fiber.

10. An apparatus, comprising:

an optical fiber;

an actuator configured to generate a force to vary an orientation of a first end of the optical fiber; and a joint mechanically coupling the actuator to the optical fiber, wherein the joint is configured to couple the force generated by the actuator to the optical fiber, and wherein the joint comprises:

a neck extending along an axis, the optical fiber being threaded through an aperture extending along the axis through the neck, wherein the optical fiber is attached to the joint at a surface of the neck facing the axis, a collar extending along the axis, wherein the actuator is mechanically attached to the joint at an inner surface of the collar facing the axis, and a flexural element extending radially from the neck to the collar, wherein the flexural element comprises a gimbal structure.

11. An apparatus, comprising:

an optical fiber;

an actuator configured to generate a force to vary an orientation of a first end of the optical fiber; and a joint mechanically coupling the actuator to the optical fiber, wherein the joint is configured to couple the force generated by the actuator to the optical fiber, and wherein the joint comprises:

a neck extending along an axis, the optical fiber being threaded through an aperture extending along the axis through the neck, wherein the optical fiber is attached to the joint at a surface of the neck facing the axis, a collar extending along the axis, wherein the actuator is mechanically attached to the joint at an inner surface of the collar facing the axis, and a flexural element extending radially from the neck to the collar, wherein the flexural element comprises one or more beams extending from the neck to the collar.

12. An apparatus, comprising:

an optical fiber;

an actuator configured to generate a force to vary an orientation of a first end of the optical fiber; and a joint mechanically coupling the actuator to the optical fiber, wherein the joint is configured to couple the force generated by the actuator to the optical fiber, and wherein the joint comprises:

a neck extending along an axis, the optical fiber being threaded through an aperture extending along the axis through the neck, wherein the optical fiber is attached to the joint at a surface of the neck facing the axis, and wherein the neck defines one or more slots along a periphery of the neck, a collar extending along the axis, wherein the actuator is mechanically attached to the joint at an inner surface of the collar facing the axis, and a flexural element extending radially from the neck to the collar.

13. The apparatus of claim 12, wherein the one or more slots being spirally arranged about the axis.

* * * * *